(12) United States Patent
Key

(10) Patent No.: US 9,342,999 B2
(45) Date of Patent: May 17, 2016

(54) MACHINE READABLE INFORMATION INTERFACE FOR A CONTAINER

(71) Applicant: Stephen Marcus Key, Glenbrook, NV (US)

(72) Inventor: Stephen Marcus Key, Glenbrook, NV (US)

(73) Assignee: Spinlabel Technologies, Inc., Boca Raton, FL (US)

( * ) Notice: Subject to any disclaimer, the term of this patent is extended or adjusted under 35 U.S.C. 154(b) by 0 days.

(21) Appl. No.: 14/252,684

(22) Filed: Apr. 14, 2014

(65) Prior Publication Data

US 2014/0224889 A1    Aug. 14, 2014

Related U.S. Application Data

(63) Continuation-in-part of application No. 13/436,628, filed on Mar. 30, 2012, now Pat. No. 8,727,220.

(60) Provisional application No. 61/521,048, filed on Aug. 8, 2011, provisional application No. 61/832,455, filed on Jun. 7, 2013.

(51) Int. Cl.
*G06F 17/00* (2006.01)
*G09F 3/00* (2006.01)
*G06F 17/30* (2006.01)
*G06K 19/04* (2006.01)
*G09F 3/10* (2006.01)
*G09F 3/02* (2006.01)

(52) U.S. Cl.
CPC ........ *G09F 3/0297* (2013.01); *G06F 17/30879* (2013.01); *G06K 19/041* (2013.01); *G09F 3/10* (2013.01); *G09F 2003/0251* (2013.01); *G09F 2003/0272* (2013.01); *Y10T 29/49016* (2015.01)

(58) Field of Classification Search
USPC ........................ 235/375, 494, 462.01, 462.09
See application file for complete search history.

(56) References Cited

U.S. PATENT DOCUMENTS

| 332,208 A | 12/1885 | Noel |
| 736,035 A | 8/1903 | Stevenson |
| 1,054,826 A | 3/1913 | Cole |
| 1,064,576 A | 6/1913 | Washburn |
| 1,145,367 A | 7/1915 | Herter |

(Continued)

FOREIGN PATENT DOCUMENTS

| AT | 932891 | 4/2002 |
| AT | 1165378 | 9/2004 |

(Continued)

OTHER PUBLICATIONS

International Search Report and Written Opinion mailed May 25, 2012 in Patent Cooperation Treaty Application No. PCT/US12/22609, filed Jan. 25, 2012.

(Continued)

*Primary Examiner* — Ahshik Kim
(74) *Attorney, Agent, or Firm* — Carr & Ferrell LLP

(57) ABSTRACT

The present application is directed to systems and methods for an information delivery system for a container. At least one machine readable indicia may be printed on an outer surface of the container. A top label may cover at least a portion of the outer surface of the container. The top label may be rotatable about the outer surface of the container. The top label may have a transparent window allowing at least one of the machine readable indicia to be visible through the transparent window.

31 Claims, 20 Drawing Sheets

(56) References Cited

U.S. PATENT DOCUMENTS

| | | |
|---|---|---|
| 1,312,611 A | 8/1919 | Chess |
| 1,317,660 A | 9/1919 | Carlson |
| 1,334,031 A | 3/1920 | Hahn |
| 1,387,625 A | 8/1921 | Stein |
| 1,486,313 A | 3/1924 | Van Antwerp |
| 2,013,615 A | 9/1935 | Haviland |
| 2,013,616 A | 9/1935 | Rettenmeyer |
| 2,069,609 A | 2/1937 | Hanson |
| 2,129,364 A | 9/1938 | Simons et al. |
| 2,441,607 A | 5/1948 | Walls |
| 2,468,000 A | 4/1949 | Taylor |
| 2,487,274 A | 11/1949 | Schaffer |
| 2,504,076 A | 4/1950 | Lindblom |
| 2,706,464 A | 4/1955 | North |
| 2,738,564 A | 3/1956 | Guianne |
| 2,739,564 A | 3/1956 | North |
| 2,804,103 A | 8/1957 | Wall |
| 2,844,893 A | 7/1958 | Keller |
| 2,860,431 A | 11/1958 | Barnum |
| 2,931,657 A | 4/1960 | Lewis |
| 2,935,814 A | 5/1960 | Freeze |
| 2,971,283 A | 2/1961 | Parker |
| 3,233,770 A | 2/1966 | Waters |
| 3,278,182 A | 10/1966 | Lescher |
| 3,374,911 A | 3/1968 | White |
| D210,767 S | 4/1968 | Anglada |
| 3,375,954 A | 4/1968 | Honkanen et al. |
| 3,468,467 A | 9/1969 | Amberg |
| 3,488,880 A | 1/1970 | Taylor |
| 3,523,623 A | 8/1970 | Dorn |
| 3,542,229 A | 11/1970 | Beyerlein et al. |
| 3,604,584 A | 9/1971 | Shank |
| 3,633,781 A | 1/1972 | Zapata |
| 3,733,002 A | 5/1973 | Fujio |
| 3,750,317 A | 8/1973 | Morgan |
| 3,766,882 A | 10/1973 | Babbitt, III |
| 3,779,829 A | 12/1973 | Wolff |
| 3,865,671 A | 2/1975 | Kronsder |
| 3,874,977 A | 4/1975 | Pyles |
| 3,960,713 A | 6/1976 | Carey |
| 4,044,889 A | 8/1977 | Orentreich et al. |
| 4,057,251 A | 11/1977 | Jones et al. |
| 4,072,553 A | 2/1978 | Braker et al. |
| 4,203,240 A | 5/1980 | Goodwin |
| 4,312,523 A | 1/1982 | Haines |
| 4,318,683 A | 3/1982 | Fishbaugh et al. |
| 4,381,615 A | 5/1983 | Lonsmin |
| 4,405,045 A | 9/1983 | Villa-Real |
| 4,473,429 A | 9/1984 | Crankshaw |
| 4,505,497 A | 3/1985 | Katzman |
| 4,518,450 A | 5/1985 | Warmann |
| 4,533,586 A | 8/1985 | Roule et al. |
| 4,567,681 A | 2/1986 | Fumei |
| 4,589,943 A | 5/1986 | Kimball et al. |
| 4,658,974 A | 4/1987 | Fujita et al. |
| 4,680,080 A | 7/1987 | Instance |
| 4,700,976 A | 10/1987 | Loose |
| 4,724,973 A | 2/1988 | Shah |
| 4,727,667 A | 3/1988 | Ingle |
| 4,732,411 A | 3/1988 | Siegel |
| 4,844,760 A | 7/1989 | Dickey |
| 4,877,119 A | 10/1989 | Hosking |
| 4,918,604 A | 4/1990 | Baum |
| 4,920,912 A | 5/1990 | Kirkling |
| 4,955,153 A | 9/1990 | Albrecht et al. |
| D311,423 S | 10/1990 | DeSantis |
| 5,017,261 A | 5/1991 | Zodrow et al. |
| 5,048,870 A | 9/1991 | Mangini et al. |
| 5,062,917 A | 11/1991 | Zodrow |
| 5,076,613 A | 12/1991 | Kovacs |
| 5,078,826 A | 1/1992 | Rogall |
| 5,091,239 A | 2/1992 | Przeworski et al. |
| 5,104,704 A | 4/1992 | Labes et al. |
| 5,116,452 A | 5/1992 | Eder |
| 5,149,587 A | 9/1992 | Hill et al. |
| 5,154,448 A | 10/1992 | Griffin et al. |
| 5,207,011 A | 5/1993 | Coulthard |
| 5,209,367 A | 5/1993 | Van Musscher et al. |
| 5,215,622 A | 6/1993 | Schmelzer |
| 5,263,743 A | 11/1993 | Jones |
| 5,264,265 A | 11/1993 | Kaufmann |
| 5,269,085 A | 12/1993 | Chiapetta et al. |
| 5,284,363 A | 2/1994 | Gartner et al. |
| 5,321,933 A | 6/1994 | Seifert et al. |
| 5,324,559 A | 6/1994 | Brombacher |
| 5,339,998 A | 8/1994 | Warren |
| 5,342,093 A | 8/1994 | Weernink |
| 5,363,576 A | 11/1994 | Piana et al. |
| 5,370,754 A | 12/1994 | Soloman |
| 5,403,635 A | 4/1995 | Hoffman |
| 5,403,636 A | 4/1995 | Crum |
| 5,405,482 A | 4/1995 | Morrissette et al. |
| 5,462,488 A | 10/1995 | McKillip |
| 5,484,167 A | 1/1996 | Donaldson et al. |
| D368,234 S | 3/1996 | Dickinson et al. |
| 5,525,383 A | 6/1996 | Witkowski |
| 5,605,230 A | 2/1997 | Marino, Jr. et al. |
| 5,605,730 A | 2/1997 | Treleaven |
| 5,639,529 A | 6/1997 | Gozdecki et al. |
| D383,038 S | 9/1997 | Willbrandt |
| D386,947 S | 12/1997 | Lapierre et al. |
| 5,712,021 A | 1/1998 | Hernandez |
| 5,727,766 A | 3/1998 | Mayo |
| 5,727,819 A | 3/1998 | Grosskopf et al. |
| 5,738,382 A | 4/1998 | Grosskopf et al. |
| 5,741,381 A | 4/1998 | Dolence et al. |
| 5,758,096 A | 5/1998 | Barsky et al. |
| 5,799,525 A | 9/1998 | Johnson et al. |
| 5,800,893 A | 9/1998 | Harden |
| 5,809,674 A | 9/1998 | Key |
| 5,829,789 A | 11/1998 | Treleaven et al. |
| 5,830,550 A | 11/1998 | Treleaven et al. |
| 5,842,633 A | 12/1998 | Nurse |
| 5,863,628 A | 1/1999 | Barry |
| 5,883,370 A | 3/1999 | Walker et al. |
| 5,884,421 A | 3/1999 | Key |
| 5,953,170 A | 9/1999 | Glancy |
| 5,975,582 A | 11/1999 | Treleaven |
| 6,027,780 A | 2/2000 | Treleaven et al. |
| 6,035,568 A | 3/2000 | Grosskopf et al. |
| 6,047,488 A | 4/2000 | Tuszkiewicz |
| 6,048,423 A | 4/2000 | Barrash et al. |
| 6,057,019 A | 5/2000 | Barry |
| D428,307 S | 7/2000 | Yeandel |
| 6,086,697 A | 7/2000 | Key |
| 6,120,637 A | 9/2000 | Barry |
| 6,129,802 A | 10/2000 | Key |
| 6,129,959 A | 10/2000 | Mercer et al. |
| 6,158,612 A | 12/2000 | Alpert |
| D436,499 S | 1/2001 | Pritchard et al. |
| 6,212,803 B1 | 4/2001 | Key |
| 6,213,520 B1 | 4/2001 | Treleaven et al. |
| 6,237,269 B1 | 5/2001 | Key |
| 6,253,438 B1 | 7/2001 | Jespersen |
| 6,254,138 B1 | 7/2001 | Rawlings et al. |
| 6,258,200 B1 | 7/2001 | Kassab |
| 6,267,672 B1 | 7/2001 | Vance |
| D446,687 S | 8/2001 | Furman et al. |
| 6,270,121 B1 | 8/2001 | Dolan et al. |
| 6,274,236 B1 | 8/2001 | Shacklett et al. |
| 6,276,533 B1 | 8/2001 | Kaplan |
| 6,328,832 B1 | 12/2001 | Otruba et al. |
| 6,329,034 B1 | 12/2001 | Pendry et al. |
| 6,360,462 B1 | 3/2002 | Mengel |
| 6,385,878 B1 | 5/2002 | Key |
| 6,398,263 B2 | 6/2002 | Treleaven et al. |
| 6,402,872 B1 | 6/2002 | Key |
| 6,413,345 B1 | 7/2002 | Treleaven |
| D461,369 S | 8/2002 | Sims et al. |
| 6,428,639 B1 | 8/2002 | Oldenburg et al. |
| 6,431,241 B1 | 8/2002 | Gonzalo |
| 6,454,094 B1 | 9/2002 | Salani |
| 6,550,171 B1 | 4/2003 | De Werra et al. |
| 6,550,512 B2 | 4/2003 | Yang |

(56) References Cited

U.S. PATENT DOCUMENTS

| | | | |
|---|---|---|---|
| 6,561,246 B2 | 5/2003 | Yang |
| 6,575,216 B2 | 6/2003 | Yang |
| 6,581,773 B2 | 6/2003 | Kaplan |
| 6,616,189 B2 | 9/2003 | Raming |
| 6,622,878 B1 | 9/2003 | Frey |
| 6,631,578 B2 | 10/2003 | Key |
| 6,649,007 B1 | 11/2003 | Key |
| 6,669,804 B2 | 12/2003 | Pendry et al. |
| 6,722,568 B2 | 4/2004 | Blanford et al. |
| 6,737,137 B2 | 5/2004 | Franko, Sr. et al. |
| 6,752,431 B1 | 6/2004 | Matthews et al. |
| 6,755,442 B2 | 6/2004 | Franko, Sr. et al. |
| 6,779,480 B2 | 8/2004 | Zamjahn |
| 6,786,515 B2 | 9/2004 | Franko, Sr. |
| 6,793,075 B1 | 9/2004 | Jeter |
| 6,793,755 B2 | 9/2004 | Schaupp et al. |
| 6,811,640 B2 | 11/2004 | Franko, Sr. |
| 6,904,867 B2 | 6/2005 | Zamjahn |
| 7,010,877 B2 | 3/2006 | Geary |
| D526,847 S | 8/2006 | Freeman |
| 7,087,298 B2 | 8/2006 | Key |
| D527,583 S | 9/2006 | Freeman |
| D533,748 S | 12/2006 | Bresler |
| 7,172,220 B2 | 2/2007 | Franko, Sr. |
| 7,172,668 B2 | 2/2007 | Key |
| 7,179,514 B2 | 2/2007 | Olsen et al. |
| D545,429 S | 6/2007 | Hays |
| 7,278,579 B2 * | 10/2007 | Loffredo et al. ......... 235/462.46 |
| 7,325,510 B2 | 2/2008 | Giewercer |
| 7,601,410 B2 | 10/2009 | Matthews et al. |
| 7,621,231 B2 | 11/2009 | McNeely |
| 7,628,427 B2 | 12/2009 | Adler et al. |
| 7,782,479 B2 | 8/2010 | Handa et al. |
| 7,875,142 B2 | 1/2011 | Matthews et al. |
| 7,886,909 B2 | 2/2011 | Robinson |
| 7,926,851 B2 | 4/2011 | Kaufman |
| 8,037,628 B2 | 10/2011 | Kaufman |
| 8,043,993 B2 | 10/2011 | Roth et al. |
| D649,396 S | 11/2011 | Wilkens et al. |
| 8,142,596 B1 | 3/2012 | Valenti, Jr. et al. |
| 8,245,752 B2 | 8/2012 | Lingier et al. |
| 8,272,562 B2 | 9/2012 | Ziegler |
| 8,413,884 B2 | 4/2013 | Lim et al. |
| 8,424,761 B2 | 4/2013 | Yanagi |
| D682,088 S | 5/2013 | De Urquijo Carmona |
| 8,479,919 B2 | 7/2013 | Kaplan et al. |
| 8,500,022 B2 | 8/2013 | Kidwell et al. |
| 8,709,198 B2 | 4/2014 | Key |
| 8,727,220 B2 | 5/2014 | Key |
| D706,624 S | 6/2014 | Key |
| D706,625 S | 6/2014 | Key |
| 8,814,217 B2 | 8/2014 | Key |
| 8,973,755 B2 | 3/2015 | Key |
| 9,085,402 B2 | 7/2015 | Key |
| 2001/0004152 A1 | 6/2001 | Treleaven et al. |
| 2001/0017181 A1 | 8/2001 | Otruba et al. |
| 2001/0025442 A1 | 10/2001 | Key |
| 2001/0045741 A1 | 11/2001 | Shacklett et al. |
| 2001/0050242 A1 | 12/2001 | Kaplan |
| 2002/0015813 A1 | 2/2002 | Pendry et al. |
| 2002/0017784 A1 | 2/2002 | Merry et al. |
| 2002/0029635 A1 | 3/2002 | Kremen |
| 2002/0038685 A1 | 4/2002 | Key |
| 2002/0096261 A1 | 7/2002 | Yang |
| 2002/0096262 A1 | 7/2002 | Yang |
| 2002/0096264 A1 | 7/2002 | Yang |
| 2002/0104613 A1 | 8/2002 | Key |
| 2002/0130182 A1 | 9/2002 | Mondie |
| 2002/0139292 A1 | 10/2002 | Giewercer |
| 2002/0185212 A1 | 12/2002 | Schaupp et al. |
| 2002/0193225 A1 | 12/2002 | Raming |
| 2003/0006606 A1 | 1/2003 | Franko, Sr. et al. |
| 2003/0012911 A1 | 1/2003 | Campbell |
| 2003/0015105 A1 | 1/2003 | Dewig et al. |
| 2003/0030270 A1 | 2/2003 | Franko, Sr. et al. |
| 2003/0091819 A1 | 5/2003 | Franko, Sr. |
| 2003/0118768 A1 | 6/2003 | Sellars |
| 2003/0137145 A1 | 7/2003 | Fell et al. |
| 2003/0175463 A1 | 9/2003 | Olsen et al. |
| 2003/0189490 A1 | 10/2003 | Hogerton et al. |
| 2003/0201064 A1 | 10/2003 | Treleaven et al. |
| 2004/0108237 A1 | 6/2004 | McClintock |
| 2004/0123565 A1 | 7/2004 | Rice et al. |
| 2004/0166277 A1 | 8/2004 | Key |
| 2004/0188998 A1 | 9/2004 | Henthorn |
| 2004/0197513 A1 | 10/2004 | Shacklett et al. |
| 2004/0207193 A1 | 10/2004 | Franko, Sr. |
| 2004/0247863 A1 | 12/2004 | Scott |
| 2005/0038558 A1 | 2/2005 | Keene |
| 2005/0056203 A1 | 3/2005 | Giewercer |
| 2005/0097004 A1 | 5/2005 | Masse Blume |
| 2005/0120600 A1 | 6/2005 | Harman |
| 2005/0181165 A1 | 8/2005 | Franko |
| 2005/0183982 A1 | 8/2005 | Giewercer |
| 2005/0190914 A1 | 9/2005 | Chen et al. |
| 2005/0209870 A1 | 9/2005 | Alden |
| 2006/0029761 A1 | 2/2006 | Matthews et al. |
| 2006/0032923 A1 | 2/2006 | Krupa |
| 2006/0078701 A1 | 4/2006 | Glasier |
| 2006/0145471 A1 | 7/2006 | Franko |
| 2006/0249950 A1 | 11/2006 | Kenney et al. |
| 2007/0029787 A1 | 2/2007 | Loftin et al. |
| 2007/0034103 A1 | 2/2007 | Kaufman |
| 2007/0043530 A1 | 2/2007 | O'Rourke |
| 2007/0119542 A1 | 5/2007 | Williams et al. |
| 2007/0209753 A1 | 9/2007 | Gonzalez et al. |
| 2007/0209755 A1 | 9/2007 | Smith |
| 2007/0213214 A1 | 9/2007 | Roth et al. |
| 2007/0221319 A1 | 9/2007 | Morgan |
| 2007/0222205 A1 | 9/2007 | Handa et al. |
| 2007/0252379 A1 | 11/2007 | Bethune et al. |
| 2007/0299693 A1 | 12/2007 | Jung et al. |
| 2008/0003391 A1 | 1/2008 | Franko et al. |
| 2008/0003410 A1 | 1/2008 | Shacklett et al. |
| 2008/0010874 A1 | 1/2008 | Londino |
| 2008/0014344 A1 | 1/2008 | Fort et al. |
| 2008/0073902 A1 | 3/2008 | Franko |
| 2008/0121688 A1 | 5/2008 | Harrop |
| 2008/0176955 A1 | 7/2008 | Heck et al. |
| 2008/0208694 A1 | 8/2008 | Baggott |
| 2008/0233405 A1 | 9/2008 | Dronzek, Jr. |
| 2008/0303264 A1 | 12/2008 | Kaufman |
| 2008/0303265 A1 | 12/2008 | Kaufman |
| 2009/0205747 A1 * | 8/2009 | Lillard, Jr. ...................... 141/94 |
| 2009/0236023 A1 | 9/2009 | Lingier et al. |
| 2009/0255623 A1 | 10/2009 | Bagung et al. |
| 2009/0264815 A1 | 10/2009 | Grogan, Jr. |
| 2009/0265188 A1 | 10/2009 | Lamy et al. |
| 2009/0294521 A1 | 12/2009 | de la Huerga |
| 2009/0301921 A1 | 12/2009 | Kidwell |
| 2010/0043267 A1 | 2/2010 | Sterling |
| 2010/0044438 A1 | 2/2010 | Chen et al. |
| 2010/0084077 A1 | 4/2010 | Matthews et al. |
| 2010/0101681 A1 | 4/2010 | Kramer et al. |
| 2010/0130339 A1 * | 5/2010 | Junkins ........................... 493/84 |
| 2010/0228615 A1 | 9/2010 | Hays |
| 2010/0240133 A1 | 9/2010 | Brivanlou et al. |
| 2010/0295916 A1 | 11/2010 | Kaufman |
| 2010/0300599 A1 | 12/2010 | Fort et al. |
| 2010/0307947 A1 | 12/2010 | Marden et al. |
| 2011/0061802 A1 | 3/2011 | Raming |
| 2011/0151115 A1 | 6/2011 | Lingier |
| 2011/0169602 A1 | 7/2011 | Gaffney |
| 2011/0185606 A1 | 8/2011 | Londino |
| 2011/0233095 A1 | 9/2011 | Seidl |
| 2012/0006712 A1 | 1/2012 | Kaplan et al. |
| 2012/0010299 A1 | 1/2012 | Kaplan et al. |
| 2012/0037299 A1 | 2/2012 | Baeta et al. |
| 2012/0085828 A1 | 4/2012 | Ziegler |
| 2012/0118503 A1 | 5/2012 | Lorence et al. |
| 2012/0125526 A1 | 5/2012 | Key |
| 2012/0175336 A1 | 7/2012 | Miller et al. |
| 2012/0268837 A1 | 10/2012 | Rittenburg et al. |
| 2012/0279632 A1 | 11/2012 | Lingier et al. |

(56) References Cited

U.S. PATENT DOCUMENTS

| | | |
|---|---|---|
| 2012/0292219 A1 | 11/2012 | Terwilliger et al. |
| 2013/0025175 A1 | 1/2013 | Key |
| 2013/0025529 A1 | 1/2013 | Key |
| 2013/0026056 A1 | 1/2013 | Key |
| 2013/0026747 A1 | 1/2013 | Key |
| 2013/0033031 A1 | 2/2013 | Key |
| 2013/0036634 A1 | 2/2013 | Key |
| 2013/0036641 A1 | 2/2013 | Key |
| 2013/0037619 A1 | 2/2013 | Key |
| 2013/0043157 A1 | 2/2013 | Key |
| 2013/0062239 A1 | 3/2013 | Key |
| 2013/0129971 A1 | 5/2013 | Key et al. |
| 2014/0076766 A1 | 3/2014 | Key |
| 2014/0210198 A1 | 7/2014 | Key |
| 2014/0339120 A1 | 11/2014 | Key |
| 2014/0353196 A1 | 12/2014 | Key |

FOREIGN PATENT DOCUMENTS

| | | |
|---|---|---|
| AU | 723118 | 11/2000 |
| BE | 932891 | 4/2002 |
| BE | 1165378 | 9/2004 |
| CH | 932891 | 4/2002 |
| CH | 1165378 | 9/2004 |
| CN | 1424963 | 6/2003 |
| CN | 103492157 | 1/2014 |
| CN | 103890826 | 6/2014 |
| DE | 69711903.3-08 | 4/2002 |
| DE | 1165378 | 9/2004 |
| DK | 85214 | 3/1958 |
| DK | 932891 | 4/2002 |
| EP | 285514 | 10/1988 |
| EP | 932891 | 4/2002 |
| EP | 1165378 | 9/2004 |
| EP | 2643145 | 10/2013 |
| EP | 2742501 | 6/2014 |
| ES | 932891 | 4/2002 |
| FR | 965522 | 9/1950 |
| FR | 1114750 | 4/1956 |
| FR | 1347102 | 11/1963 |
| FR | 2460260 | 1/1981 |
| FR | 285514 | 10/1988 |
| FR | 2613519 | 10/1988 |
| FR | 2677786 | 12/1992 |
| FR | 932891 | 4/2002 |
| FR | 1165378 | 9/2004 |
| GB | 932891 | 4/2002 |
| HK | 1039770 | 5/2002 |
| HK | 1021056 | 7/2002 |
| IE | 932891 | 4/2002 |
| IE | 1165378 | 9/2004 |
| IT | 327286 | 7/1935 |
| IT | 932891 | 4/2002 |
| MX | 204456 | 9/2002 |
| MX | 225535 | 1/2005 |
| MX | 227727 | 5/2005 |
| MX | 2013005713 | 11/2013 |
| NL | 932891 | 4/2002 |
| NZ | 334683 | 11/1999 |
| SE | 1565 | 7/1888 |
| SE | 932891 | 4/2002 |
| WO | WO98/19289 | 5/1998 |
| WO | WO0023910 | 4/2000 |
| WO | WO00/48161 | 8/2000 |
| WO | WO0055831 | 9/2000 |
| WO | WO0075908 | 12/2000 |
| WO | WO0178977 | 10/2001 |
| WO | WO03017174 | 2/2003 |
| WO | WO2007020628 | 2/2007 |
| WO | WO2012071355 | 5/2012 |
| WO | WO2013015838 | 1/2013 |
| WO | WO2013015839 | 1/2013 |
| WO | WO2013016364 | 1/2013 |
| WO | WO2013016461 | 1/2013 |
| WO | WO2013019907 | 2/2013 |
| WO | WO2013022495 | 2/2013 |
| WO | WO2013022508 | 2/2013 |
| WO | WO2013023221 | 2/2013 |
| WO | WO2013025947 | 2/2013 |
| WO | WO2013039578 | 3/2013 |
| WO | WO2013043618 | 3/2013 |
| WO | WO2014047077 | 3/2014 |

OTHER PUBLICATIONS

International Search Report and Written Opinion mailed May 23, 2012 in Patent Cooperation Treaty Application No. PCT/US2012/022610, filed Jan. 25, 2012.

International Search Report and Written Opinion mailed Oct. 9, 2012 in Patent Cooperation Treaty Application No. PCT/US2012/048021, filed Jul. 24, 2012.

International Search Report and Written Opinion mailed Oct. 23, 2012 in Patent Cooperation Treaty Application No. PCT/US2012/050643, filed Aug. 13, 2012.

International Search Report and Written Opinion mailed Nov. 30, 2012 in Patent Cooperation Treaty Application No. PCT/US2012/055948, filed Sep. 18, 2012.

International Search Report and Written Opinion mailed Jul. 26, 2012 in Patent Cooperation Treaty Application No. PCT/US2012/037395, filed May 10, 2012.

International Search Report and Written Opinion mailed Oct. 16, 2012 in Patent Cooperation Treaty Application No. PCT/US2012/048201, filed Jul. 25, 2012.

International Search Report and Written Opinion mailed Jul. 9, 2012 in Patent Cooperation Treaty Application No. PCT/US2012/031670, filed Mar. 30, 2012.

International Search Report and Written Opinion mailed Oct. 23, 2012 in Patent Cooperation Treaty Application No. PCT/US2012/051228, filed Aug. 16, 2012.

International Search Report and Written Opinion mailed Oct. 16, 2012 in Patent Cooperation Treaty Application No. PCT/US2012/049234, filed Aug. 1, 2012.

International Search Report and Written Opinion mailed Aug. 27, 2012 in Patent Cooperation Treaty Application No. PCT/US2012/040301, filed May 31, 2012.

Newswire, "AccuDial(R) Pharmaceutical, Inc. can put an end to underdosing and overdosing with new line of children's over-the-counter medications", Jul. 8, 2010 [retrieved Dec. 12, 2013]. Retrieved from Internet: <http://www.newswire.ca/en/story/646945/accudial-r-pharmaceutical-inc-can-put-an-end-to-underdosing-and-overdosing-with-new-line-of-children-s-over-the-counter-medications>.

Accudial Pharmaceutical, Inc. company website, www.accuratedose.com, Oct. 30, 2010 [retrieved Aug. 7, 2012). Retrieved from Internet: <http://web.archive.org/web/20101030115353/http://www.accuratedose.com.ca_english/home>.

Anonymous, "Chest congestion (guaifenesin) liquid", Internet article, http://dailymed.nlm.nih.gov/dailymed/druginfo.cfm?id=25295., (Oct. 26, 2009).

Anonymous, "Pharmaceutical & medical packaging news", The packaging magazine for the healthcare industry, 16:12:76-78, Internet article, http://www.accuratedose.com/corporate/assets/pdf/PMP_MagReprinIDec08.pdf, (Dec. 12, 2008).

A. Abramson, "Start-up has twist on safe doses for kids", Internet article, http://www.accuratedose.com/corporate/assets/pdf/50840_ACC_PBP_Article. pdf, (Jul. 27,2009).

Anonymous, "Chest congestion guaifenesin oral solution expectorant", Internet article, http://accuratedose.com/us_english/producUnformation/chest_congestion.html, (Aug. 24, 2011).

International Search Report and Written Opinion mailed Apr. 2, 2012 in Patent Cooperation Treaty Application No. PCT/US2011/061739, filed Nov. 21, 2011.

International Search Report and Written Opinion mailed Feb. 28, 2014 in Patent Cooperation Treaty Application No. PCT/US2013/060220, filed Sep. 17, 2013.

(56) References Cited

OTHER PUBLICATIONS

Practicing Math Before Doing the Laundry, Published on Jun. 23, 2010, http://uiobservatory.com/2010/practicing-math-before-doing-the-laundry/.

Tide and Gain are Proctor & Gamble products (cell), (photo taken on Jan. 18, 2010) https://www.flickr.com/photos/43229768@N00/4285687839.

Office Action mailed Feb. 9, 2015 in CN Application No. 201180056061.4.

Supplementary European Search Report mailed Apr. 2, 2015 in EP Application No. 11843040.4.

Extended European Search Report mailed Jul. 2, 2015 in EP Application No. 12822168.6.

Office Action mailed Sep. 17, 2015 in CN Application No. 201280048480.8.

* cited by examiner

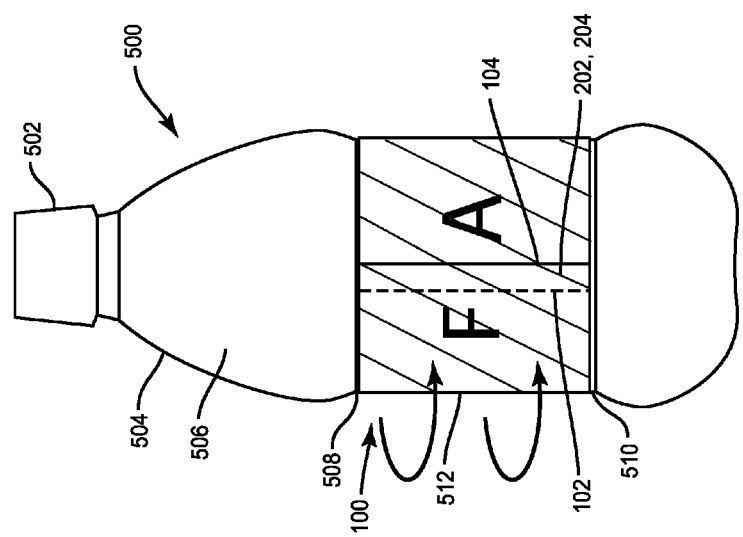

MACHINE READABLE INFORMATION INTERFACE FOR A CONTAINER

CROSS-REFERENCE TO RELATED APPLICATIONS

The present application is a continuation in part of U.S. patent application Ser. No. 13/436,628, filed on Mar. 30, 2012, titled "Machine Readable Information Interface for a Container," which in turn claims priority to provisional U.S. Patent Application Ser. No. 61/521,048, filed on Aug. 8, 2011, titled "Rotating Label Containing Bar Codes, QR Codes or Other Graphical Codes that Provide Additional Information Once Scanned by a Smart Phone." This application also claims priority to provisional U.S. Patent Application Ser. No. 61/832,455, filed on Jun. 7, 2013, titled "Rotatable label Device Including a Game, Contest, and/or Game Piece Promotion and the Interaction Between Said Pieces." All of the above-referenced applications are hereby incorporated by reference in their entirety.

FIELD OF THE INVENTION

The present application is directed generally to labels, and more specifically to labels for consumer product containers that function as an information delivery system.

BACKGROUND

Containers for consumer products have a limited amount of outer surface area for placement of labels on the container. This may pose a challenge to manufacturers of these consumer products to fit all of the information they want to deliver to the consumer, or are required by law to deliver to the consumer, in this limited area.

SUMMARY

The present application is directed to information delivery systems for a cup. An exemplary information delivery system may comprise one or more machine readable indicia printed or otherwise coupled to an outer surface of the cup. The information delivery system may further comprise a top label covering at least a portion of the outer surface of the cup. The top label may be rotatable about the outer surface. In various embodiments, the top label may have a transparent window allowing at least one of the machine readable indicia to be visible through the transparent window.

According to additional exemplary embodiments, the present application may be directed to methods for delivering information associated with a cup. An exemplary method may comprise printing or otherwise coupling one or more machine readable indicia on an outer surface of the cup. At least a portion of the outer surface of the cup may be covered by a rotating top label. A transparent window may be placed within the rotating top label, such that at least one of the machine readable indicia may be visible through the transparent window.

BRIEF DESCRIPTION OF THE DRAWINGS

FIG. 5B illustrates an exemplary label secured about a container according to various embodiments.

DETAILED DESCRIPTION

The present application is directed to information delivery systems for a cup and methods delivering information associated with a cup. An exemplary information delivery system may comprise one or more machine readable indicia printed or otherwise coupled to an outer surface of the cup. The information delivery system may further comprise a top label covering at least a portion of the outer surface of the cup. The top label may be rotatable about the outer surface. In various embodiments, the top label may have a transparent window allowing at least one of the machine readable indicia to be visible through the transparent window.

Figure 1:
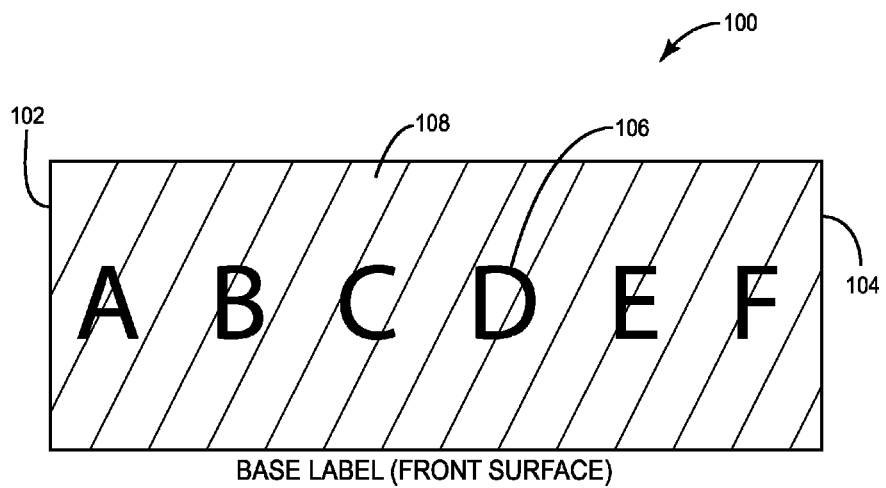
FIG. 1 is a front view of an exemplary label according to various embodiments.

FIG. 1 illustrates various embodiments of a front surface 108 of a base label 100 for an object, such as a medication container, according to various embodiments. The base label 100 comprises a leading edge 102 and a trailing edge 104.

While the leading edge 102 is oriented to the left and the trailing edge is oriented to the right as presented in FIG. 1, the orientation of the leading edge 102 and the trailing edge 104 could be reversed depending on which edge is first applied to the object. Both orientations are within the scope of the present disclosure. Base label front surface 108 may comprise writing or other indicia 106 thereon.

As used herein, the leading edge refers to the first edge to be affixed to the object and the trailing edge refers to the second edge to be affixed to the object or the overlapping leading edge. Depending on the orientation of the label and the object when the label is affixed to the object, either edge of the label may be the leading edge. The orientations presented in the figures are for convenience and are not intended to be limiting in any way.

Figure 2:
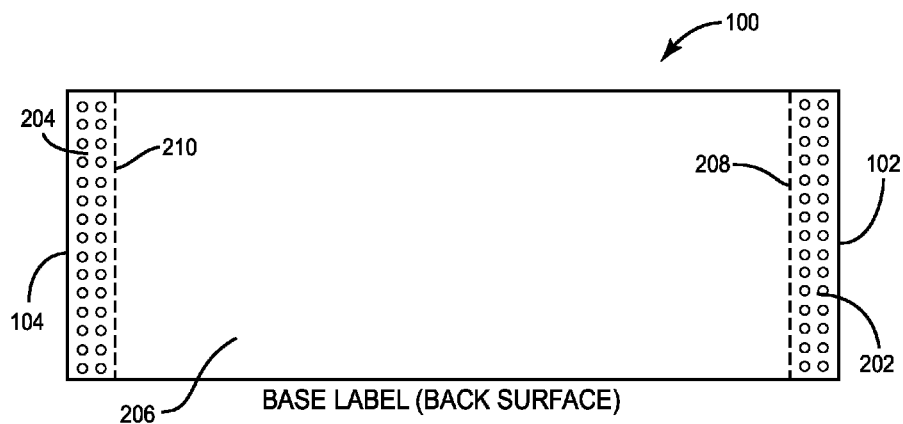
FIG. 2 is a back view of an exemplary label according to various embodiments.

FIG. 2 illustrates various embodiments of a back surface 206 of the base label 100. In various embodiments, the base label back surface 206 comprises two strips of adhesive 202 and 204 on or immediately adjacent to the leading and trailing edges, 102 and 104, respectively. Base label leading edge adhesive 202 may have a boundary 208 defined as its limit on the base label back surface 206. Base label trailing edge adhesive 204 may also have a boundary 210. While FIG. 2 illustrates that the adhesive strips 202 and 204 are generally close to the base label leading and trailing edges 102 and 104, respectively, it is understood that the adhesive strips 202 and 204 may be continuous or discontinuous, and may extend across any portion of the base label back surface 206, including the entire base label back surface 206. In various embodiments, a length of the base label 100 may be selected to be slightly longer than a circumference of the object on which it is placed, such that the trailing edge 104 overlaps the leading edge 102, and the trailing edge 104 is affixed to the leading edge 102. In various embodiments, the length of the base label 100 may be selected to be approximately the same as the circumference of the object on which it is placed, such that the leading edge 102 and the trailing edge 104 do not overlap.

Figure 3:
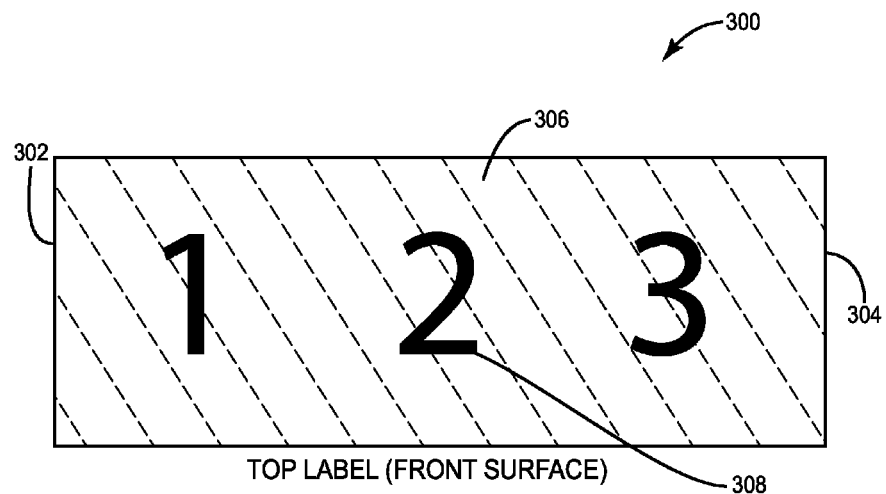
FIG. 3 is a front view of an exemplary label according to various embodiments.

FIG. 3 illustrates various embodiments of a front surface 306 of a top label 300. Top label 300 comprises a leading edge 302 and a trailing edge 304, and indicia 308 may be imprinted on the top label front surface 306.

Figure 4:
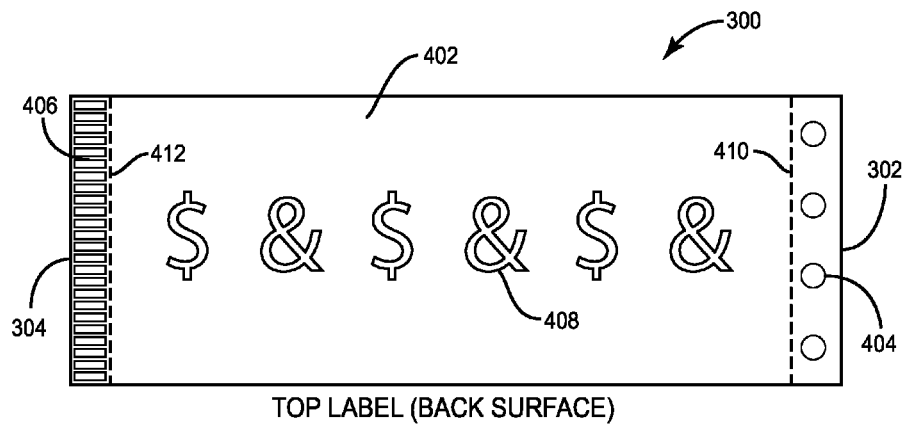
FIG. 4 is a back view of an exemplary label according to various embodiments.

Various embodiments of a back surface 402 of the top label 300 are illustrated in FIG. 4. The top label back surface 402 may comprise various indicia 408 printed thereon, as well as two strips of adhesive 404 and 406 on or immediately adjacent to the leading and trailing edges, 302 and 304, respectively. Top label leading edge adhesive 404 may have a boundary 410 defined as its limit on the top label back surface 402. Top label trailing edge adhesive 406 may also have a boundary 412. While FIG. 4 illustrates that the adhesive strips 404 and 406 are generally close to the top label leading and trailing edges 302 and 304, respectively, it is understood that the adhesive strips 404 and 406 may be continuous or discontinuous, and may extend across any portion of the top label back surface 402, including the entire top label back surface 402. In various embodiments, the adhesive strips 404 and 406 are confined to areas near the leading and trailing edges 302 and 304, respectively, so as not to obscure or interfere with the top label back surface indicia 408.

The base label adhesive 202, 204 and the top label adhesive 404, 406 may be applied in a variety of patterns as can be appreciated by one skilled in the art. The adhesive 202, 204, 404, 406 may be applied in strips, dots, droplets, circles, rectangles, squares, triangles, lines, and the like, as well as combinations of patterns.

A length of the top label 300 may be selected to be slightly longer than a circumference of the object on which it is placed, such that the top label trailing edge 304 overlaps the top label leading edge 302, and the top label trailing edge 304 is affixed to the top label leading edge 302. In various embodiments, the length of the top label 300 may be selected to be approximately the same as the circumference of the object on which it is placed, such that both the leading edge 302 and the trailing edge 304 do not overlap and are affixed to the base label front surface 108.

Figure 5A:
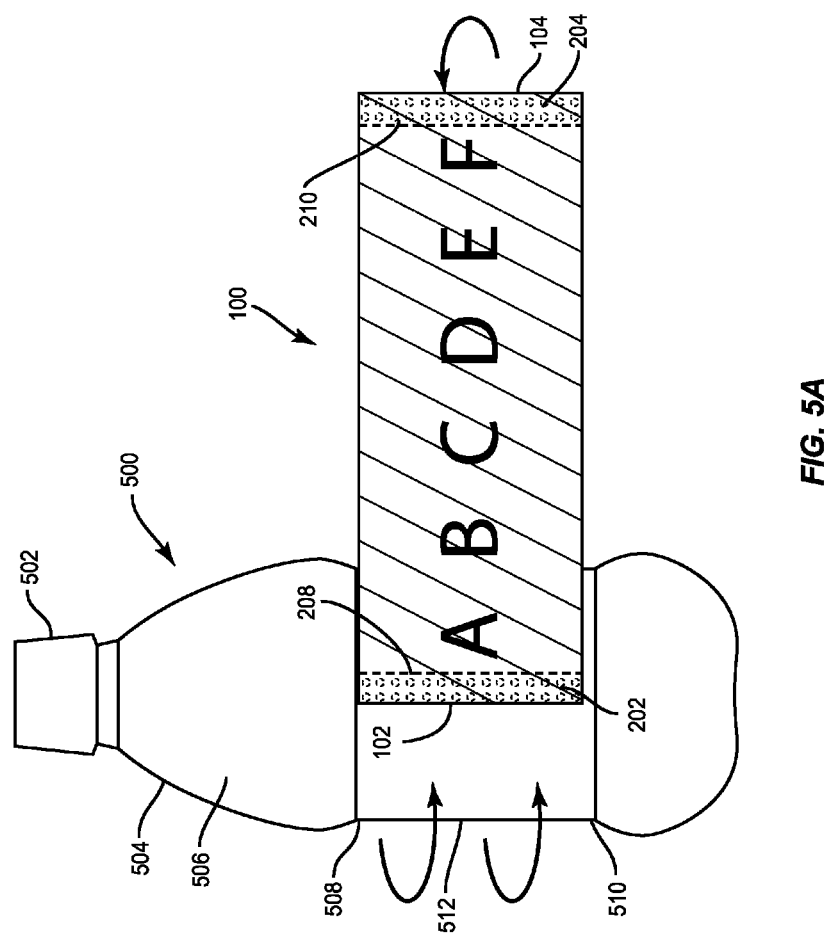
FIG. 5A illustrates a leading edge of an exemplary label affixed to a container according to various embodiments.

FIG. 5A illustrates the application of the base label 100 to an exemplary container 500 according to various embodiments. The container 500 may be a glass or plastic bottle, or other type of container such as a metal can or a cardboard receptacle. The container may be round, rectangular, square, or any other shape known in the art. The term "container" is used here for convenience to describe exemplary embodiments. It is understood that the container may be any object, including non-containers. Container 500 may comprise a cap 502 removably secured to a body 504. Various embodiments of the body 504 may have an exterior surface 506 that comprises a upper label panel 508, a lower label panel 510, and a recessed surface 512 interposed between the upper label panel 508 and the lower label panel 510. As discussed below, the base label 100 may be applied to the container 500 at the recessed area 512 between the upper label panel 508 and the lower label panel 510.

In various embodiments, the top label 300 may be rotatable about the base label 100, as discussed below. In these embodiments, the upper label panel 508 and lower label panel 510 may function to restrict upward and downward movement of the top label 300 in relation to the container 500 such that the top label 300 generally remains in a position covering at least a portion of the base label 100.

FIG. 5B illustrates the container 500 with the base label 100 affixed to the container 500. Initially, as illustrated in FIG. 5A, base label leading edge 102 is placed in contact with the recessed surface 512 of the container 500 and affixed to the container 500 by the leading edge adhesive strip 202. With relative motion between the container 500 and the base label 100, the base label 100 may be wrapped around the container 500 with the base label trailing edge 104 now overlapping the base label leading edge 102 such that the leading edge adhesive strip 202 holds the base label leading edge 102 to the container 500 while the base label trailing edge adhesive 204 holds the base label trailing edge 104 to the overlapped base label leading edge 102.

Figure 6:
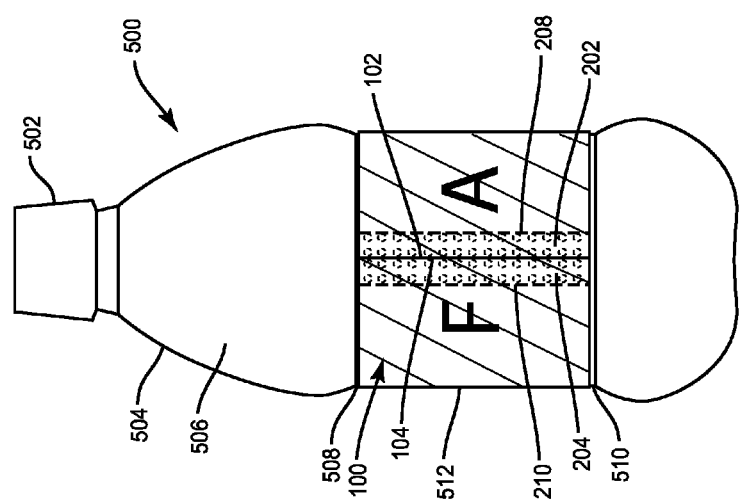
FIG. 6 illustrates an exemplary label secured about a container according to various embodiments.
Figure 7:
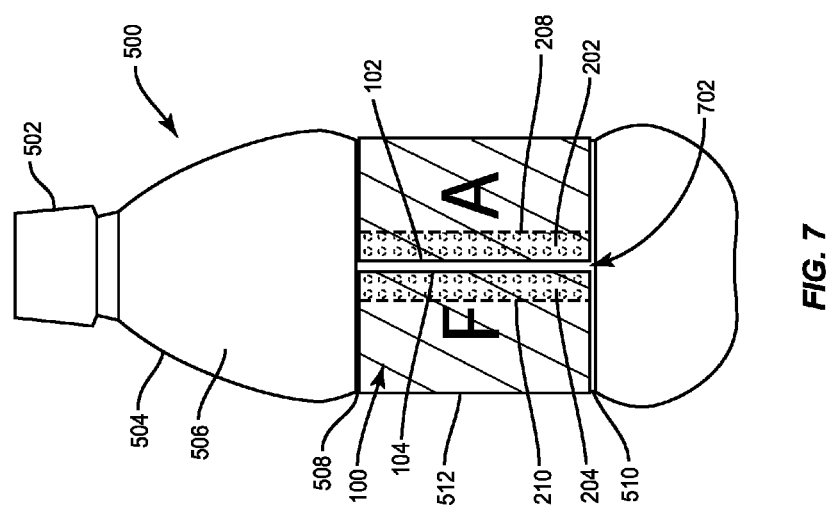
FIG. 7 illustrates an exemplary base label secured about a container according to various embodiments.

In various embodiments as illustrated in FIG. 6, the length of the base label 100 may be substantially the same as a circumference of the recessed surface 512 of the container 500, which may allow the base label leading edge 102 and base label trailing edge 104 to abut rather than overlap. However, it is also possible that the length of the base label 100 may be shorter than the circumference of the recessed surface 512, resulting in a gap 702 between the base label leading edge 102 and the base label trailing edge 104 when the base label 100 is affixed to the recessed surface as illustrated in FIG. 7. In both of these instances, the base label trailing edge adhesive strip 204 may adhere to the recessed surface 512 of the container 500, rather than the base label leading edge 102.

In various embodiments, the base label adhesive strips 202, 204 may comprise a permanent adhesive. In general, a permanent adhesive is one that does not readily release from a surface to which it adheres after the adhesive dries or cures. Using the base label 100 as an example, the permanent adhesive 202, 204 will tend not to release from the recessed surface 512, nor will it tend to release from the base label leading edge 102 or trailing edge 104 once dried or cured. In order to remove the base label from the recessed surface 512, the base label 100 may have to be torn from the adhesive, or the adhesive layer 202, 204 may have to be fractured which may leave some of the adhesive on the recessed surface 512 and some of the adhesive on the base label leading edge 102 or trailing edge 104. Once the surfaces affixed with the permanent adhesive are separated, they may not be reattached.

Figure 8:
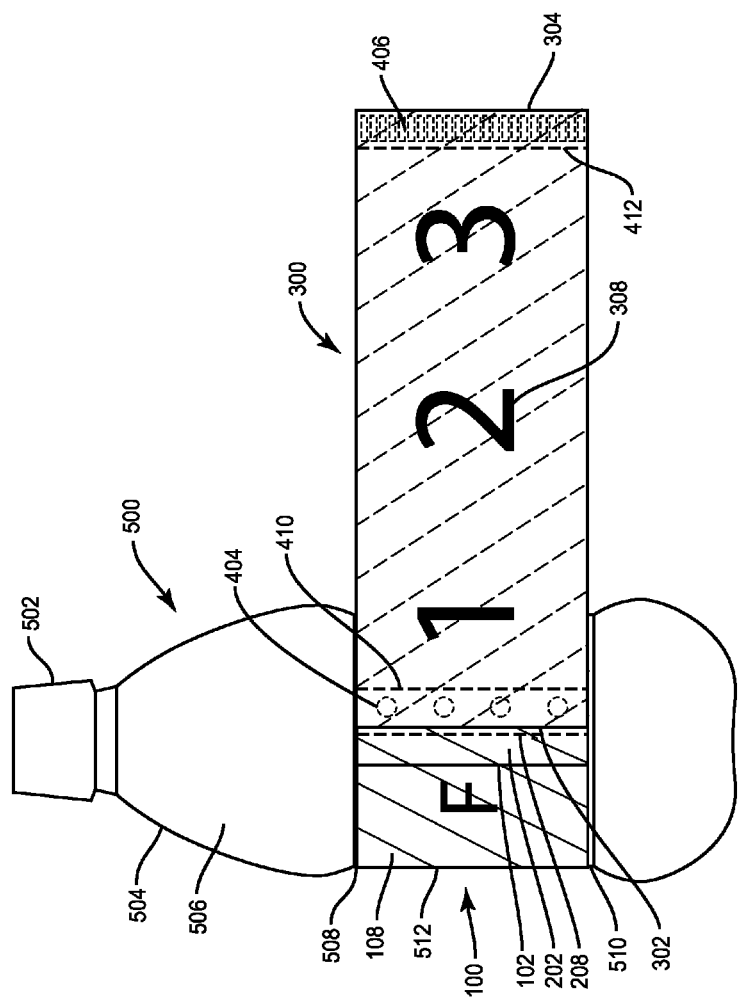
FIG. 8 illustrates a leading edge of an exemplary top label affixed to an exemplary base label according to various embodiments.

In FIG. 8, the base label 100 is already affixed to the recessed surface 512 of the container 500, and the application of the top label 300 over the base label 100 is illustrated according to various embodiments. The top label leading edge 302 may be placed in contact with any portion of the base label front surface 108 and affixed to the base label front surface 108 by the top label leading edge adhesive strip 404. With relative motion between the container 500 and the top label 300, the top label 300 may be wrapped around the container 500 with the top label trailing edge 304 now overlapping the top label leading edge 302 such that the top label leading edge adhesive strip 404 holds the top label leading edge 302 to the base label 100 while the top label trailing edge adhesive strip 406 holds the top label trailing edge 304 to the overlapped top label leading edge 302.

Figure 9:
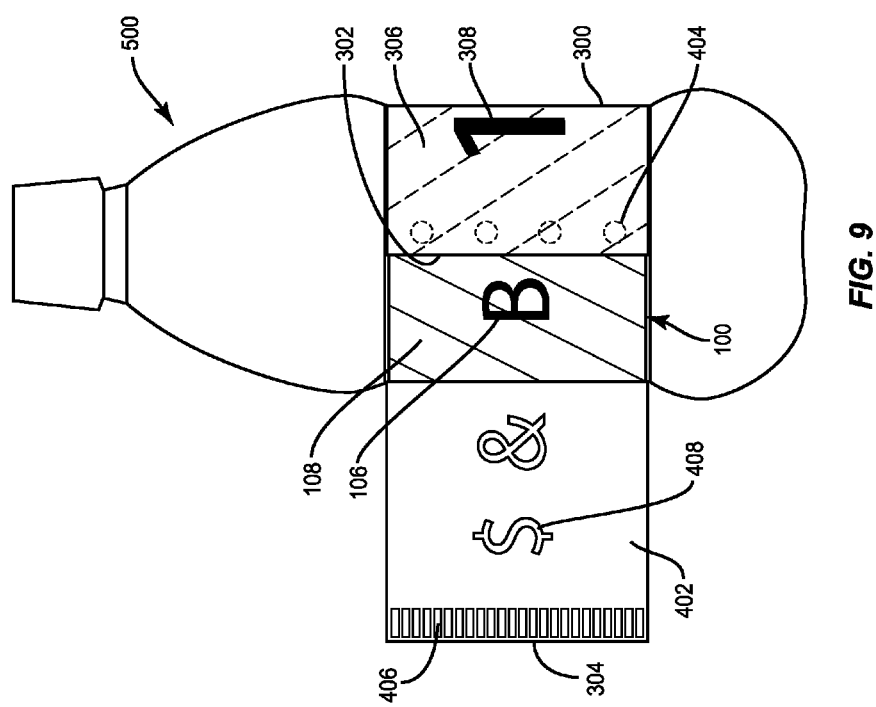
FIG. 9 illustrates an exemplary top label affixed to an exemplary base label and partially wrapped about a container according to various embodiments.

FIG. 9 illustrates the operation of the base label 100 and the top label 300 according to various embodiments. Beginning with the container 500 with the base label 100 and the top label 300 in place as shown, for example, in FIG. 6, the top label trailing edge 304 may be detached from the top label leading edge 302 and at least partially peeled back as shown in FIG. 9. The combination of the base label 100 and the top label 300 in this configuration increases the amount of surface area available for viewing by a consumer or user of the container 500. Prior to detaching the top label trailing edge 304, the consumer may view the top label front surface 306. Upon detaching the top label trailing edge 304, the consumer may now view the top label back surface 402 and the base label front surface 108 in addition to the top label front surface 306.

One of at least three types of adhesive may be used for the top label leading edge adhesive 404. A first type of adhesive is the permanent adhesive as described above for the base label 100. When a permanent adhesive is used for the top label leading edge adhesive 404, the top label leading edge generally cannot be detached without inflicting damage to one or both of the top label 300 or the base label 100. This may be desirable for various embodiments where the top label 300 is not intended to be removed from the container 500.

A second type of adhesive that may be used for the top label leading edge adhesive 404 is a releasable adhesive. A releasable adhesive is one that will release from a surface to which it is attached once a sufficient mechanical force is applied. A releasable adhesive may be used, for example, when the top label back surface 402 comprises a coupon for a subsequent purchase of a product. The releasable adhesive may allow the consumer to easily remove the top label 300 for later use. In various embodiments, the releasable adhesive may be a breakaway adhesive. A breakaway adhesive may have limited ability to withstand shear stresses. Shear stresses may cause the adhesive bond created between the label (e.g., top label 300) and the surface to which it is affixed (e.g., the base label 100 or container 500) to fail along the adhesive. In general, a releasable or breakaway adhesive may not re-attach to a surface once removed.

A third type of adhesive that may be used for the top label leading edge adhesive 404 is a resealable adhesive. A resealable adhesive may release from a surface to which it is attached once a sufficient mechanical force is applied, similar to the releasable adhesive described above. However, the resealable adhesive may be re-attached to a surface by applying pressure. A resealable adhesive may be desirable when the top label back surface 402 or the base label front surface 108 comprise information that may be needed only on occasion. Thus, the consumer or user may detach the top label 300 when the information is needed, then re-attach the top label 300.

In various embodiments, the top label trailing edge adhesive 406 may be a releasable adhesive or a resealable adhesive, depending on the intended use of the top label 300. As described above, if the surfaces 108, 402 comprise information that is intended to stay with the container, the top label trailing edge adhesive 406 may be a resealable adhesive. In contrast, if the top label 300 is intended to be removed from the container 500, a releasable adhesive may be desirable.

Figure 10:
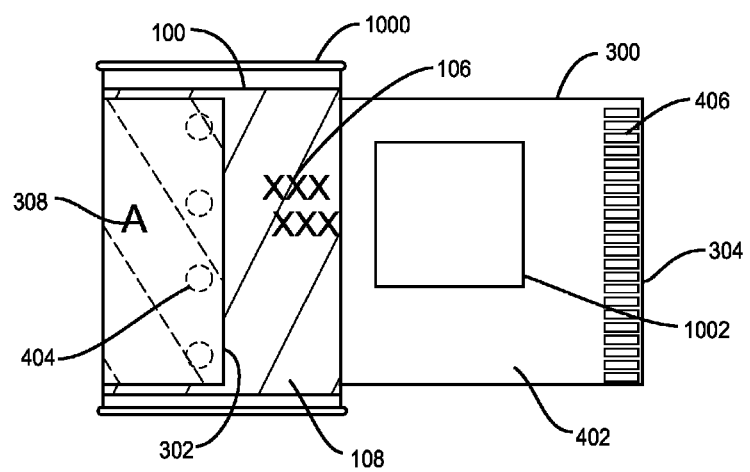
FIG. 10 illustrates an exemplary top label with a window affixed to an exemplary base label and partially wrapped about a container according to various embodiments.

FIG. 10 illustrates various embodiments of the top label 300 comprising a window 1002. The window 1002 may comprise a void in the top label 300 such that a portion of the base label 100 may be visible through the window. In various embodiments, the window 1002 may have a transparent covering (not shown). In various other embodiments, the window may comprise a transparent section of the top label 300 itself rather than a void. FIG. 10 illustrates the top label 300 partially wrapped about a container 1000, and base label 100 already in place on the container 1000. As shown, the top label leading edge adhesive 404 maintains the top label 300 coupled to the base label 100. The top label 300 may then be moved from the position illustrated in FIG. 10 to the position illustrated in FIG. 11 to secure the top label 300 about the container 1000. Top label trailing edge adhesive 406 may couple to the top label leading edge 302 if the top label leading edge 302 and trailing edge 304 overlap; otherwise, the top label trailing edge adhesive 406 may be coupled to the base label front surface 108.

Figure 11:
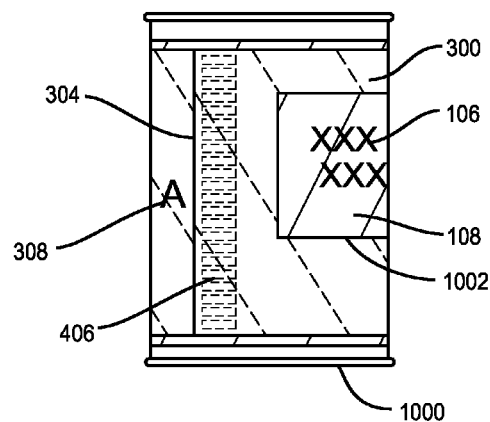
FIG. 11 illustrates an exemplary top label with a window secured about a container and a portion of a base label visible through the window according to various embodiments.

Once the top label 300 is in position on the container 1000 as illustrated in FIG. 11, at least a portion of the base label indicia 106 may be visible through the window 1002. This may allow viewing of a first portion of the base label 100 without removing the top label 300. In various embodiments, the top label leading edge adhesive 404 may be a breakaway adhesive. Rotation of the top label 300 relative to the base label 100 may exert shear stresses on the breakaway adhesive, causing the adhesive bond affixing the top label leading edge 302 to the base label 100 to fail. The top label 300 may then be freely rotatable about the base label 100, and a second portion of the base label 100 may be visible when the top label 300 is rotated to a second position. The window 1002 may be rectangular as illustrated in FIGS. 10 and 11, or any other shape as needed for a particular application. For example, the window 1002 may be a slit that reveals an alphanumeric string on the base label 100. In various embodiments, the top label 300 may comprise more than one window 1002. Various embodiments in which the top label trailing edge adhesive 406 is a resealable or releasable adhesive may allow the top label 300 to be peeled back to reveal the top label back surface 402 and essentially the entire base label front surface 108 or to be removed from the container 1000, in addition to being rotatable.

One skilled in the art will readily recognize that labels may be applied to containers using a variety of methods and that there may be a variety of single-label and multi-label systems other than those described above. Any such application methods or label systems may be used with the present disclosure. The above descriptions are exemplary and not to be construed as limiting in any way. Examples of other application methods and label systems may be disclosed in U.S. Pat. Nos. 5,884,421, 6,086,697, 6,237,269, 6,402,872, 6,631,578, 6,649,007, 7,087,298, and 7,172,668.

Figure 12:
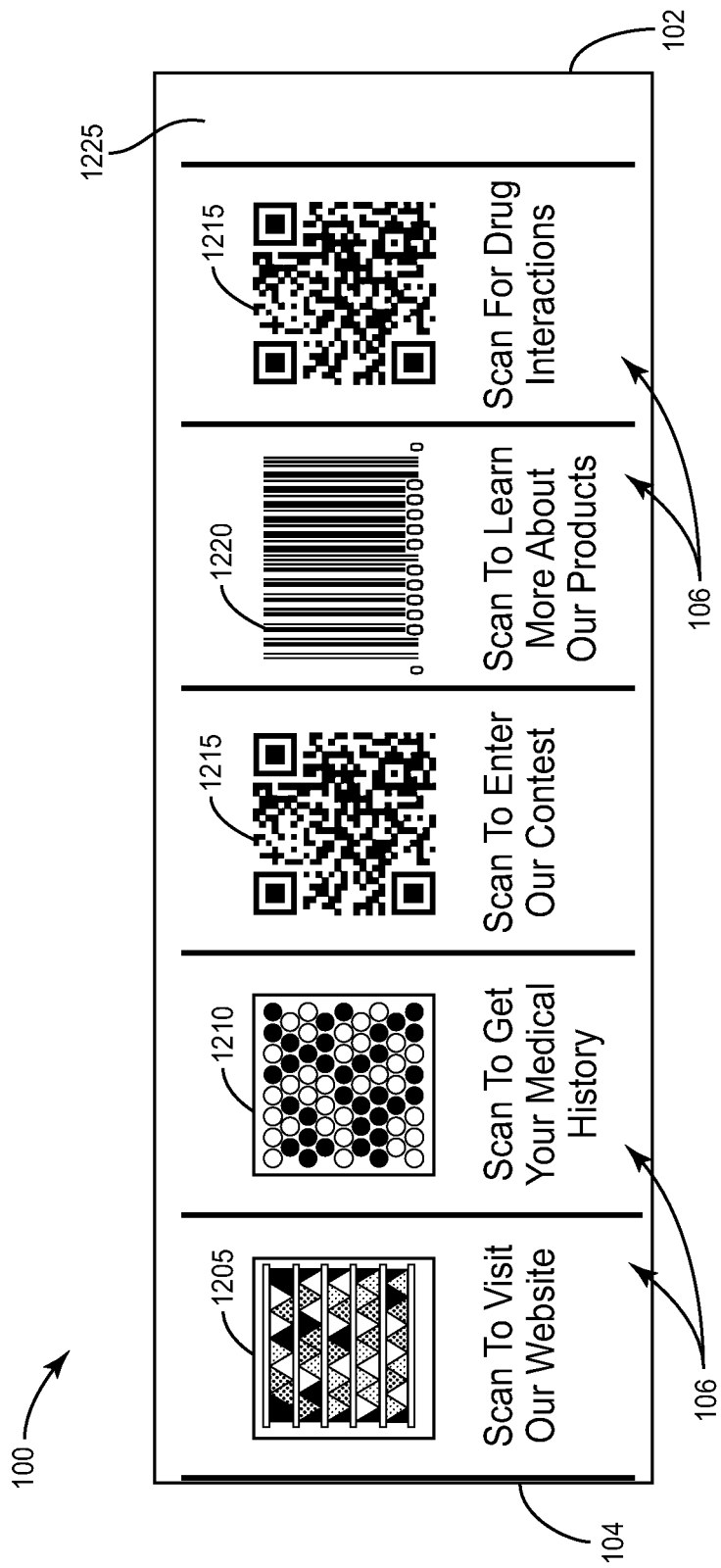
FIG. 12 is a front view of a base label according to various embodiments.
Figure 13:
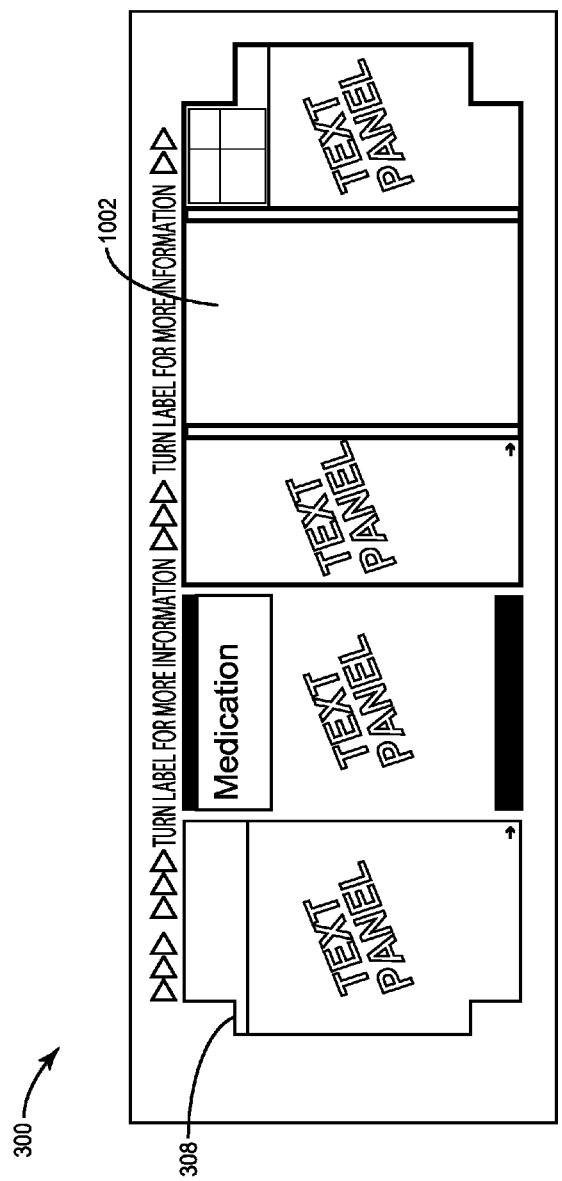
FIG. 13 is a front view of a top label according to various embodiments.

FIGS. 12 and 13 illustrate a base label 100 and top label 300, respectively, that may comprise an information delivery system for a container 1405 (see FIG. 14) according to various embodiments. The base label indicia 106 may comprise a plurality of individual machine readable indicia 1205-1220. The top label 300 may comprise indicia 308 relaying product-related information, safety-related information, manufacturer-related information, and the like. In various embodiments, the top label may contain a transparent window 1002 as described previously (see FIG. 10).

The various embodiments of the base label 100 as illustrated in FIG. 12 may comprise a blank portion 1225 along the leading edge 102 that is essentially void of any base label indicia 106. As described previously, the trailing edge 104 may overlap the leading edge 102 when the base label 100 is applied to the container 1405. The blank portion 1225 may provide a space for attachment of the trailing edge without obscuring any of the base label indicia 106.

In various embodiments, the machine readable indicia 1205-1220 may comprise any linear, 2-dimensional, or 3-dimensional indicia or code as known in the art that may be machine readable to cause an electronic device to execute a function when the machine readable indicia 1205-1220 is scanned by the electronic device. For example, the machine readable indicia 1205-1220 may comprise a High Capacity Color Barcode (HCCB) 1205 comprising a plurality of barcode shapes in combination with a plurality of colors per symbol. The machine readable indicia 1205 is comprised of triangular shapes, while the machine readable indicia 1210 is a HCCB code is comprised of circular shapes. According to various embodiments, the base label indicia 106 may also comprise a Quick Response (QR) Code 1215 or a linear barcode 1220.

In addition to the machine readable indicia 1205-1220 illustrated in FIG. 12, other indicia, codes, or symbols, whether linear, 2-dimensional, 3-dimensional, color, or monochrome, as are known in the art may also be used in various embodiments. For example, the base label indicia 106 may comprise any or any combination of:

- 3-DI, a 2-dimensional matrix of circular symbols;
- ArrayTag, a 2-dimensional matrix of groups of hexagonal symbols;
- Aztec Code, a 2-dimensional square matrix of square symbols;
- Codablock, a 2-dimensional array of stacked linear codes;
- Code 1, a 2-dimensional matrix of horizontal and vertical bars;
- Code 16K, a 2-dimensional array of stacked linear codes;
- Code 49, a 2-dimensional array of stacked linear codes;
- ColorCode, a 2-dimensional color matrix of square symbols;
- CP Code, a 2-dimensional square matrix of square symbols;
- DataGlyphs, a 2-dimensional matrix of "/" and "\" marks;
- Data Matrix, a 2-dimensional square matrix of square symbols;
- Datastrip Code, a 2-dimensional matrix of square symbols;
- Dot Code A, a 2-dimensional square matrix of dots;
- hueCode, a 2-dimensional matrix of blocks of cells in varying shades of gray;
- MaxiCode, a 2-dimensional square matrix of interlocking hexagonal symbols;
- MiniCode, a 2-dimensional square matrix of square symbols;
- PDF 417, a 2-dimensional matrix of a combination of linear barcodes and square symbols;
- Snowflake Code, a 2-dimensional square matrix of dots;
- SuperCode, a 2-dimensional matrix of a combination of linear barcodes and square symbols;
- Ultracode, a color or monochrome 2-dimensional array matrix of variable length strips of pixel columns; and
- 3D Barcode, an embossed linear barcode of lines of varying height.

The base label indicia 106 described above represent a sampling of exemplary machine readable indicia currently available and are not to be construed as limiting in any manner. Other linear, 2-dimensional, and 3-dimensional codes, currently known or developed in the future, are within the scope of the present disclosure. Additionally, the base label indicia 106 may comprise any combination of machine readable indicia, as well as non-machine readable indicia.

Figure 14A:
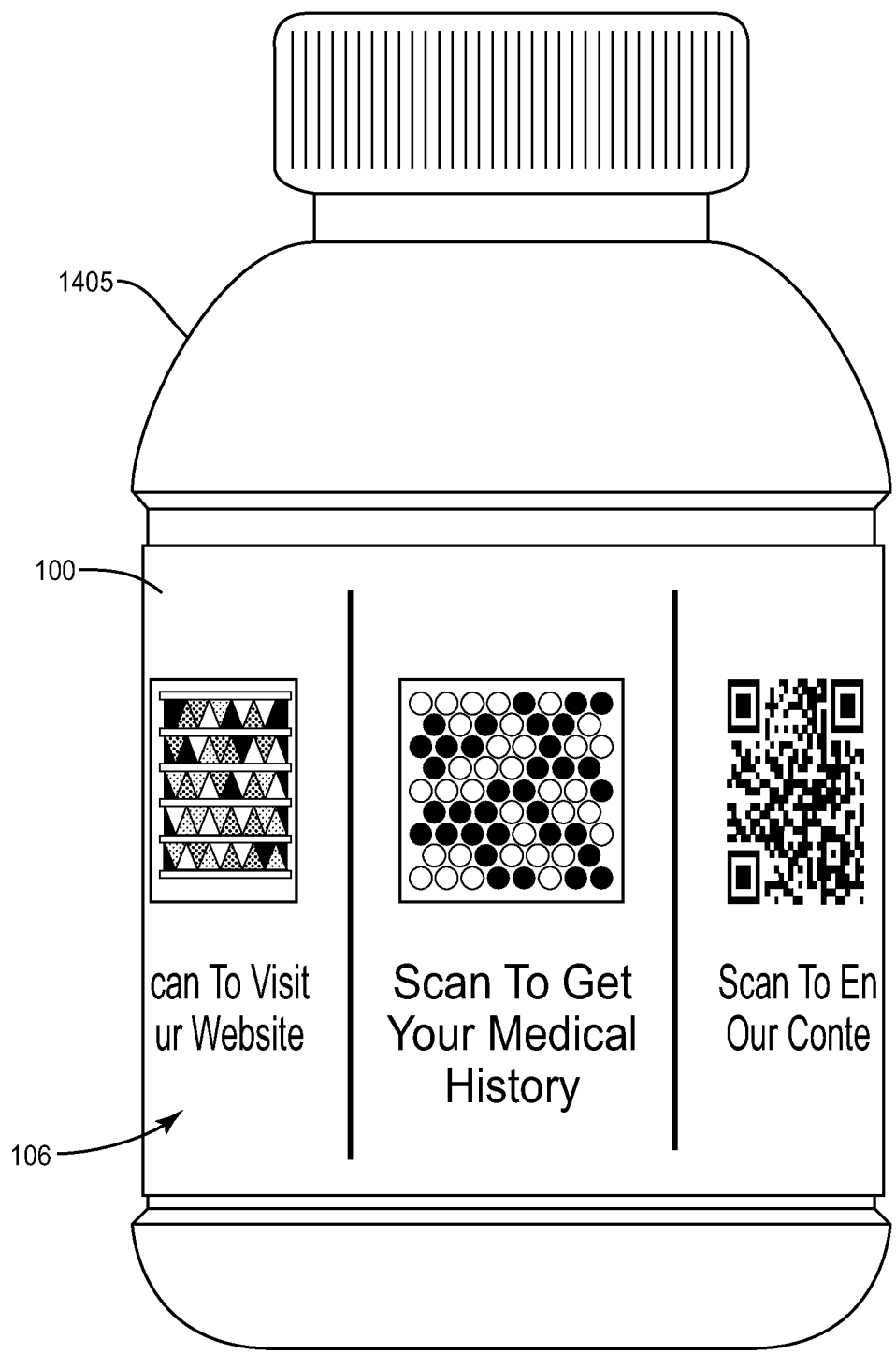
FIG. 14A illustrates an exemplary base label secured about a container according to various embodiments.
Figure 14B:
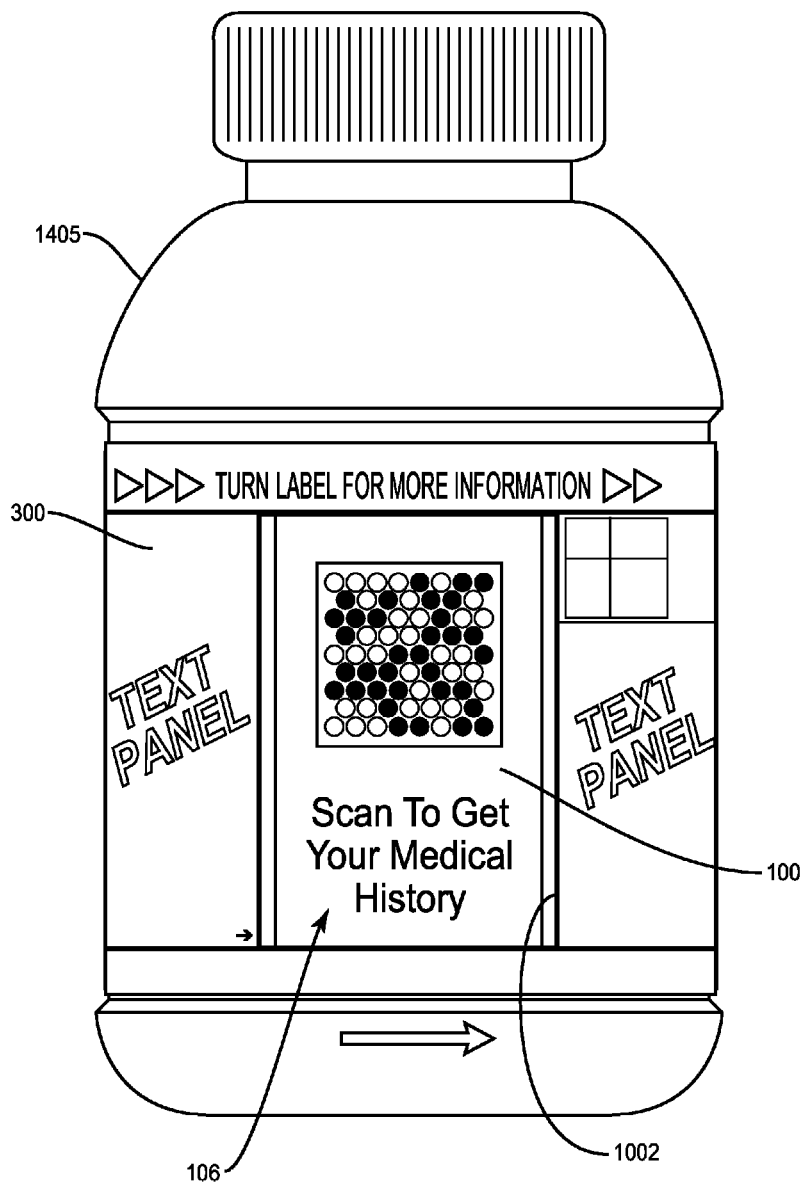
FIG. 14B illustrates an exemplary base label and top label secured about a container according to various embodiments.
Figure 14C:
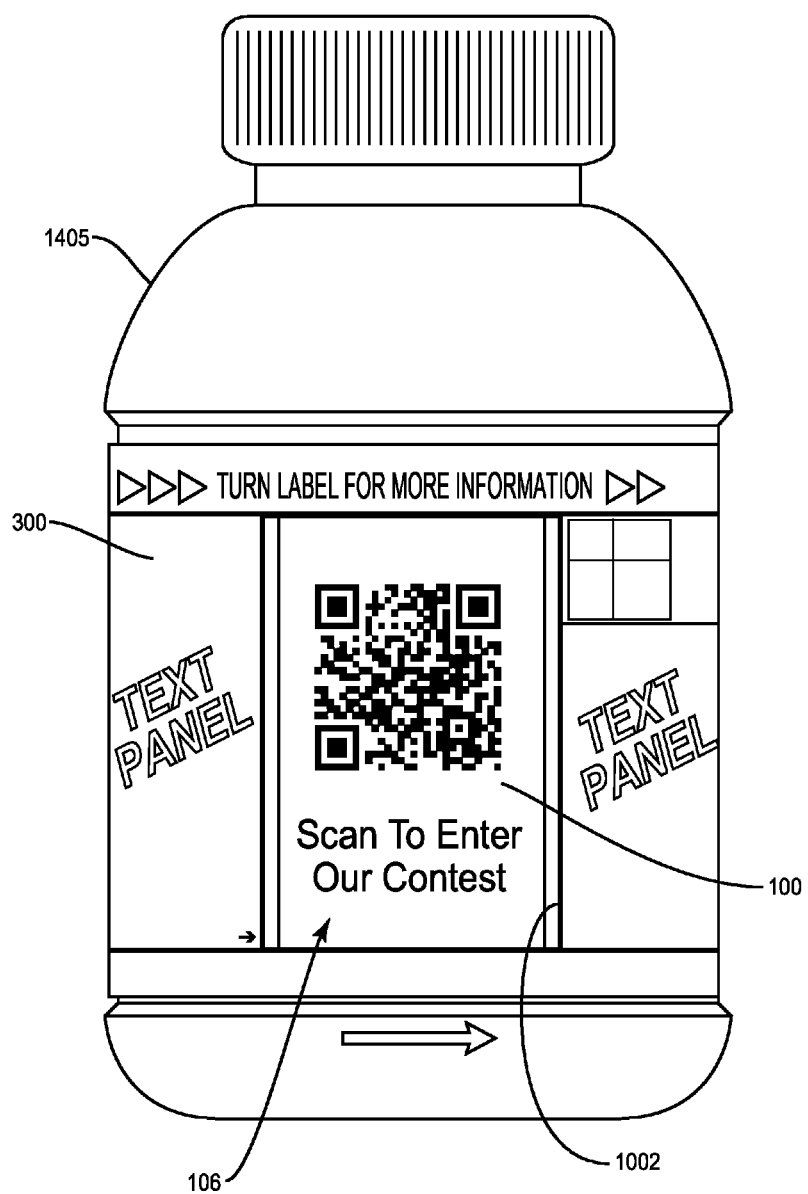
FIG. 14C illustrates an exemplary base label and top label secured about a container according to various embodiments.
Figure 14D:
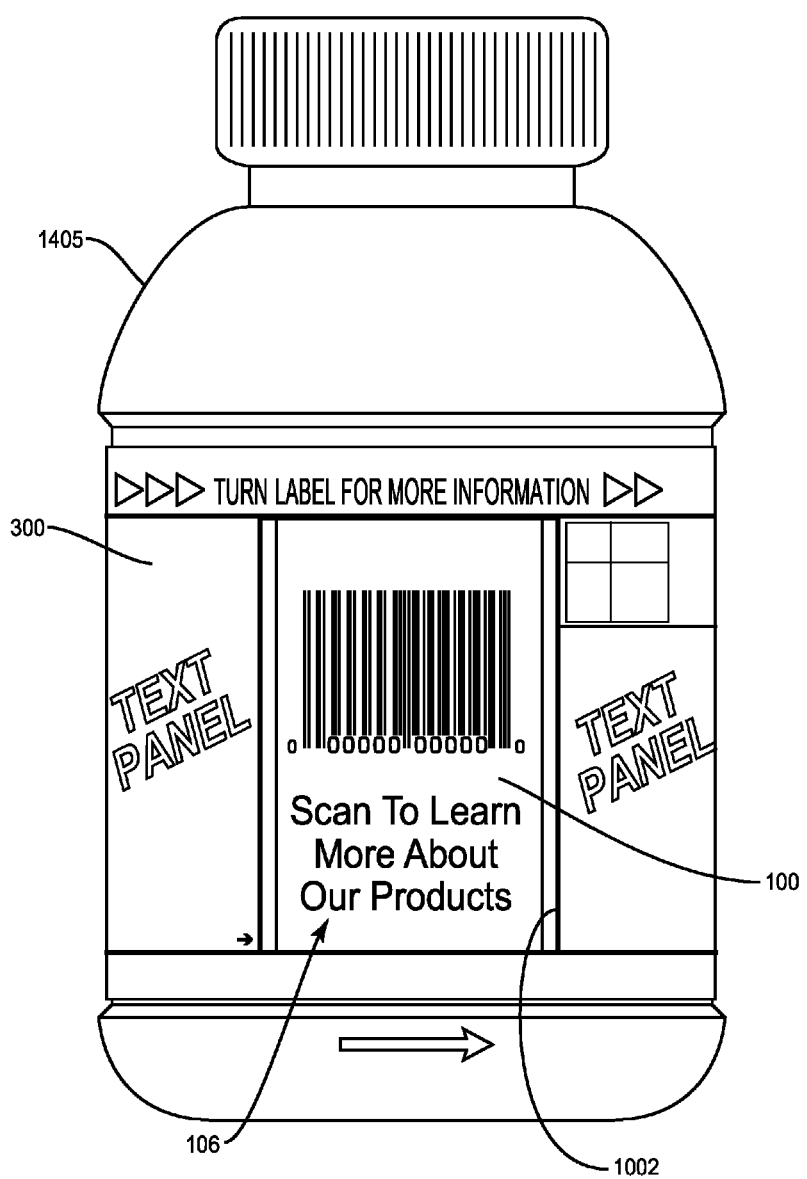
FIG. 14D illustrates an exemplary base label and top label secured about a container according to various embodiments

FIGS. 14A through 14D illustrate the base label 100 and top label 300 on a medicine container 1405 according to various embodiments. The base label 100 and the top label 300 may comprise an information delivery system that may be used, for example, on the medication container 1405 to provide additional functionality that may allow a consumer to obtain a wide variety of additional information about the product in the container 1405, the company that produced the product, medical history of the consumer, drug facts, drug interactions, games, contests, information on related products or services, or any other information. In FIG. 14A, the base label 100 is positioned on the container 1405, and the base label 100 may comprise a plurality of base label indicia 106 (all of a portion of which may be machine readable). FIG. 14B illustrates the top label 300 in place over the base label 100. As described previously, the top label 300 may be applied such that the top label 300 is rotatable around a circumference of the container 1405. In FIG. 14B, the top label 300 has been rotated in the direction of the arrow revealing at least one of the base label indicia 106 through the transparent window 1002 in the top label 300. Similarly, FIGS. 14C and 14D illustrate the top label 300 further rotated in the direction of the arrow, thus revealing a different base label indicia 106 through the transparent window 1002 of the top label 300. Although FIGS. 14B-14D illustrate a single base label indicia 106 visible through the transparent window 1002, two or more base label indicia 106 may simultaneously be visible through the transparent window 1002 in various embodiments.

The top label 300 may comprise a dual ply (or multi-ply) construction in which a ply in contact with the base label 100 is a material selected for low sliding friction characteristics. The low sliding friction characteristics may enhance the ease of rotating and sliding the top label 300 about the base label 100. In various embodiments, the top label 300 ply in contact with the base label 100 may be coated with a substance to impart the low sliding friction characteristics.

Figure 15:
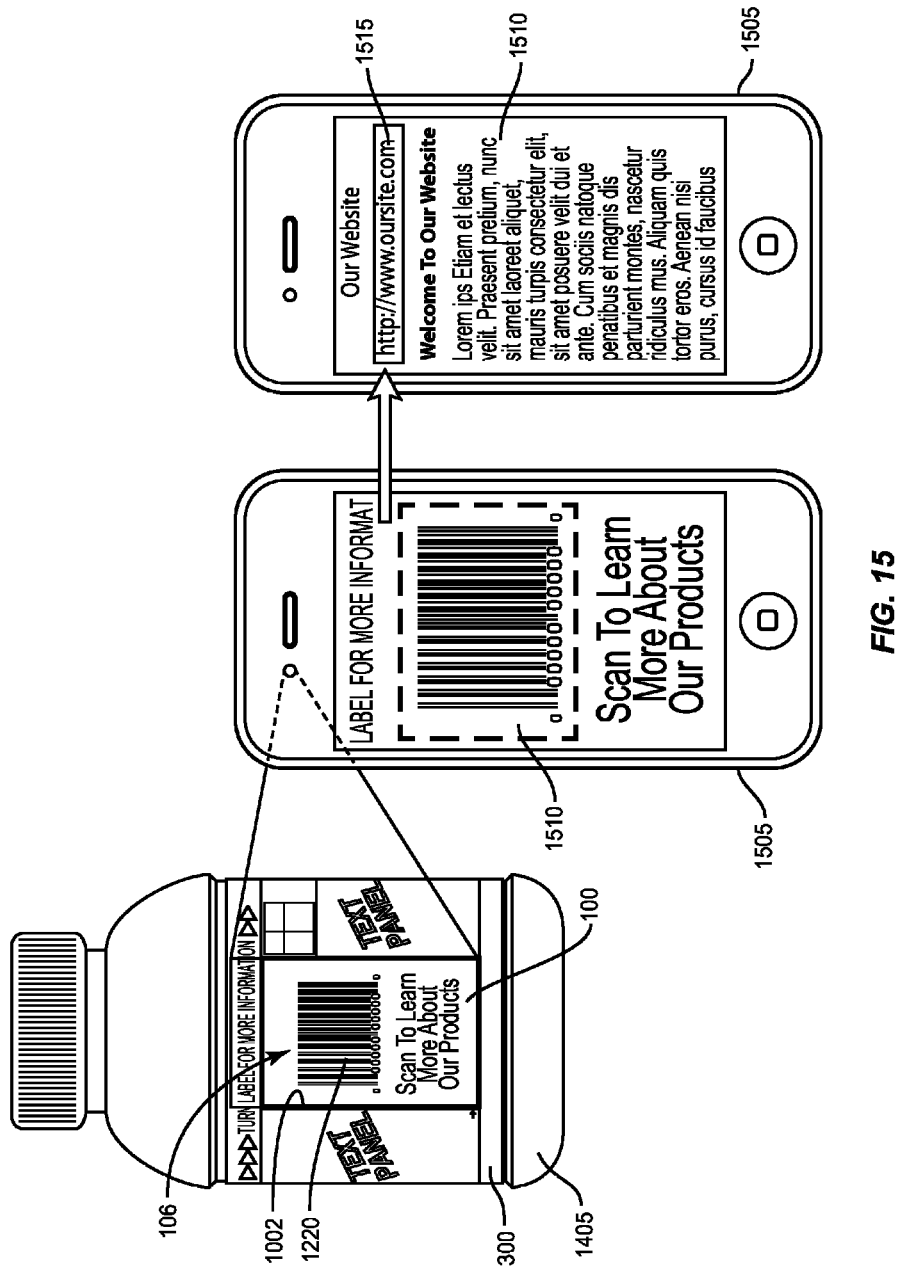
FIG. 15 illustrates an electronic device scanning an indicia on the base label according to various embodiments.

As described previously, the base label indicia 106 may comprise codes or symbols that are machine readable. According to various embodiments as illustrated in FIG. 15, the consumer may use any electronic device, such as a smartphone 1505, to read or scan the base label indicia 106. The smartphone 1505 may comprise an application that enables a reading or scanning function on the smartphone 1505. Once the smartphone 1505 (or other electronic device such as a tablet computer or scanner coupled to a computer) reads or scans the base label indicia 106, the base label indicia 106 may be configured to cause the smartphone 1505 to execute a function. In the embodiment of FIG. 15, the function executed by the smartphone 1505 may be to open a web browser program and direct the browser 1515 to a pre-designated website 1510.

In the example of FIG. 15, the base label indicia 106 comprises the barcode 1220 and additional text indicating that information about additional products may be obtained by scanning the barcode 1220. Thus, in this embodiment the consumer has scanned the barcode 1220, and the barcode 1220 has caused the smartphone 1505 to open the web browser and directed the web browser 1515 to a pre-determined website 1510 corresponding to the additional products.

As readily recognized by one skilled in the art, the function executed by the smartphone 1505 may be any function capable of being executed on an electronic computing device. For example, the function may be to display product information, or display a scannable coupon 1510 on the smartphone 1505 that the consumer may redeem at a store or online. The product information and the scannable coupon 1510 may be related to the product in the container 1405, or some other product or service. In various embodiments, the function may cause the smartphone 1505 to download an application onto the smartphone 1505, or cause an application to run or execute an application, such as launching an interactive game on the smartphone 1505. In various embodiments, the function executed may be to display medical information on the smartphone 1505, such as a medical history of the consumer, potential drug interactions, overdose information, and the like. Where the product in the container 1405 is a food ingredient, the function executed may be to display one or more recipes on the smartphone 1505 that call for the food ingredient. In still other embodiments, the function executed may cause the smartphone 1505 to take a photograph of the base label indicia 106. In some embodiments, the function executed may be to automatically register the consumer in a contest, or register the consumer to receive periodic updates about products or services. In yet further embodiments, a QR code on the cup or the container (upon scanning or reading) may allow a user of a computing device the ability to read any information about a product in the cup or in the container in the user's language of choice.

Figure 16B:
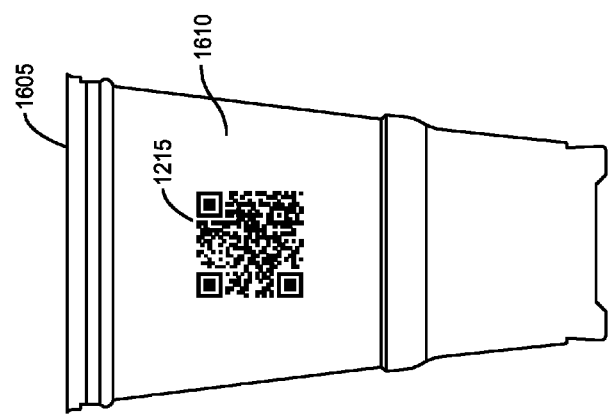
FIG. 16B is a front view of a cup with an indicia according to various embodiments.
Figure 16A:
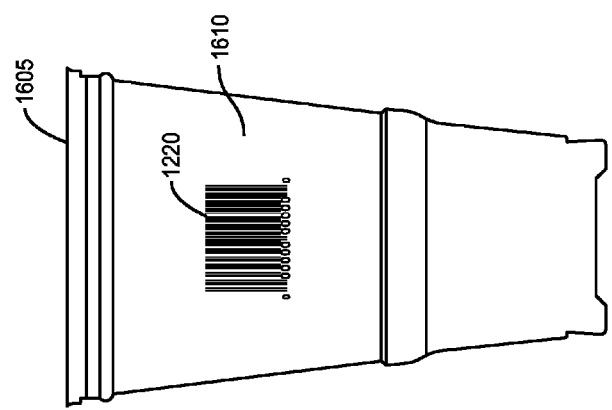
FIG. 16A is a front view of a cup with an indicia according to various embodiments.

Various embodiments as illustrated in FIGS. 16A and 16B may also comprise a cup 1605 with one or more machine readable indicia 1215, 1220 printed or otherwise coupled (as described below) to an outer surface 1610 of the cup 1605. The machine readable indicia 1215, 1220 may be provided in place of, or in conjunction with, the machine readable indicia 1205-1220 discussed above for FIG. 12. FIG. 16A illustrates a Quick Response code and FIG. 16B illustrates a linear barcode on the outer surface 1610 of the cup 1605. The machine readable indicia 1215, 1220 in FIGS. 16A and 16B are exemplary embodiments, and any machine readable indicia such as those described above in reference to FIG. 12, as well as other machine readable indicia known in the art now or in the future, are considered to be within the scope of the present disclosure.

In addition to the machine readable indicia 1215, 1220, the cup 1605 may comprise other indicia such as a text panel 1705 that conveys any of a variety of information to a user (see FIG. 17C), or other indicia (not shown) such as alphanumeric characters, coupons, crossword and other puzzle games, word search games, spelling games, number matching games, probability games, controlled probability games, continuity games, instant win games, sweepstakes, collector promotions, contest invitations, rebates, and the like.

The machine readable indicia 1215, 1220, the text panel 1705, or other indicia may be printed directly onto the outer surface 1610 of the cup 1605 via ink jet, laser, or any other printing method. The machine readable indicia 1215, 1220, text panel 1705, or other indicia may first be placed on a sticker with an adhesive backing, and then the sticker may be subsequently coupled to the outer surface 1610 of the cup 1605. Material used to print the machine readable indicia 1215, 1220, text panel 1705, or other indicia may comprise thermochromatic or color changing inks, or temperature indicating inks. The thermochromatic or color changing inks may be used to hide a message or other indicia which may become visible when the temperature of ink changes, such as when a hot or cold substance is placed into the cup 1605.

Figure 17B:
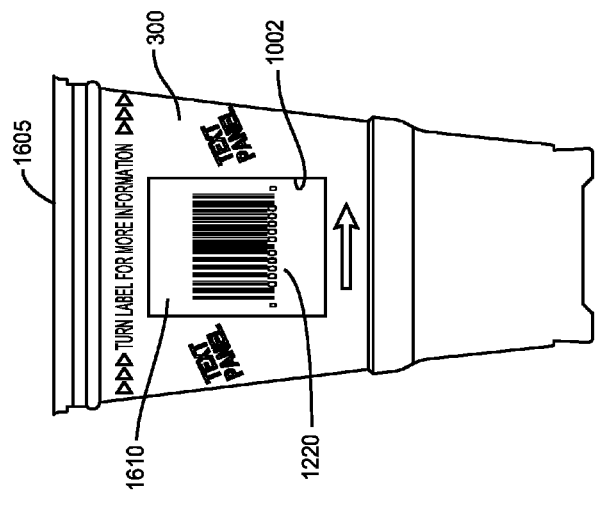
FIG. 17B is a front view of a cup with an indicia and a rotating top label according to various embodiments.
Figure 17A:
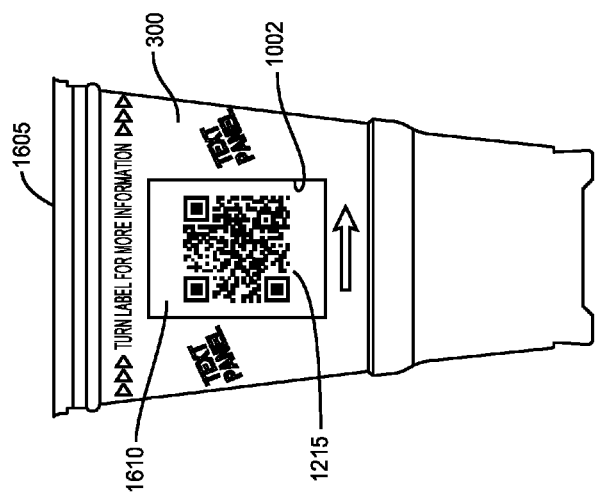
FIG. 17A is a front view of a cup with an indicia and a rotating top label according to various embodiments.
Figure 17C:
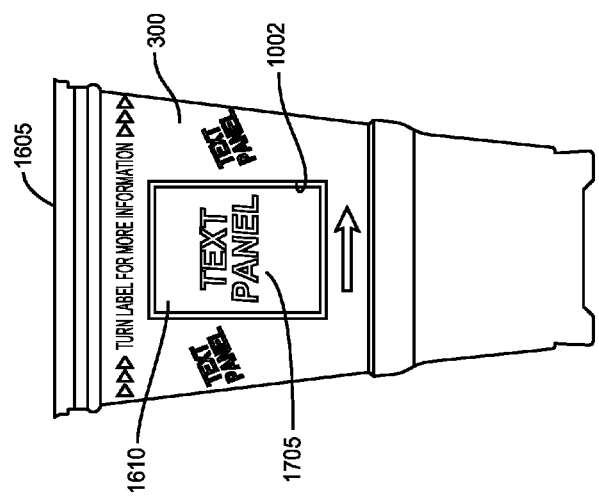
FIG. 17C is a front view of a cup with a text panel and a rotating top label according to various embodiments.

In various embodiments as illustrated in FIGS. 17A through 17C, a portion of the outer surface 1610 of the cup 1605 may be covered with the top label 300 as described previously. The top label 300 may comprise one or more transparent windows 1002, and the machine readable indicia 1215, 1220 or the text panel 1705 printed or otherwise coupled to the outer surface 1610 of the cup 1605 may be visible through the transparent window 1002. In various embodiments, the top label 300 may be rotatable about the outer surface 1610. As the top label 300 rotates about the outer surface 1610, another of the machine readable indicia 1215, 1220 or the text panel 1705 may become visible in the transparent window 1002.

Figure 18:
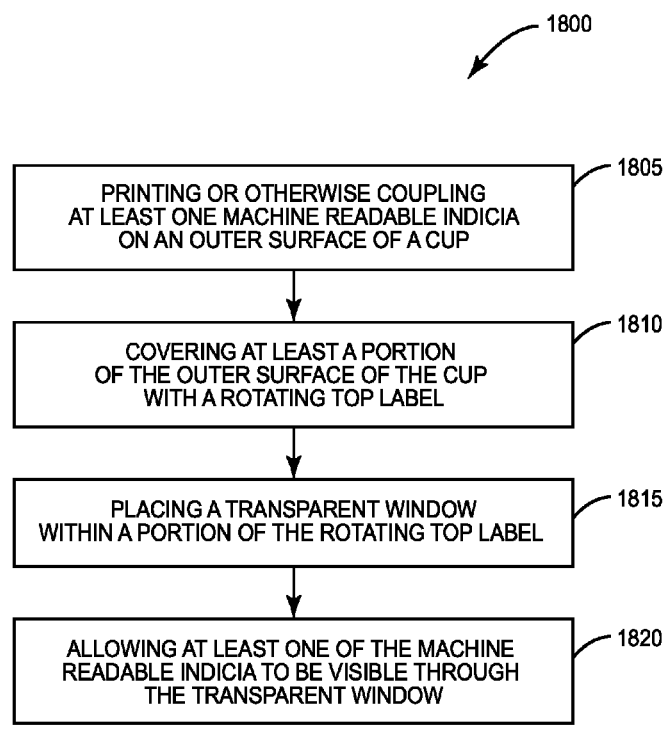
FIG. 18 is an exemplary flow diagram of a method for delivering information associated with a container according to various embodiments.

FIG. 18 illustrates a general flow chart of various embodiments of a method 1800 for delivering information associated with a cup 1605. At step 1805, at least one machine readable indicia 1215, 1220 may be printed or otherwise coupled to an outer surface 1610 of the cup 1605. Various embodiments may also comprise a text panel 1705 printed or otherwise coupled to the outer surface 1610 of the cup 1605 in addition to, or in place of, the machine readable indicia 1215, 1220. At least a portion of the outer surface 1610 of the cup 1605 may be covered with a rotating top label at step 1810. At step 1815, a transparent window 1002 may be placed within a portion of the rotating top label 300. At step 1820, at least one of the machine readable indicia 1215, 1220 may be visible through the transparent window 1002. In various other embodiments, the top label 300 may comprise multiple windows 1002 such that multiple machine readable indicia 1215, 1220 or text panels 1705 may be visible simultaneously through the multiple windows 1002.

In various embodiments, the machine readable indicia 1205-1220 and text panel 1705 may be imprinted, embossed, or molded directly on the outer surface 1610 of the cup 1605. The imprinting or embossing may be carried out using any printing or image transfer method known in the art. In various embodiments, the printing or image transfer method may be an offset process in which an image is transferred from a plate to an intermediate carrier, then to the outer surface 1610 of the cup 1605. The offset process may also involve lithographic techniques. Other printing or image transfer methods may comprise, for example, flexography, pad printing, relief printing, rotogravure, screen printing, and electrophotography. According to various embodiments, the machine readable indicia 1215, 1220 or text panel 1705 may be digitally printed on the outer surface 1610 of the cup 1605 using, for example, inkjet printing or laser printing. Chemical printing technologies, such as blueprint or diazo print may also be used in various embodiments.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

Various exemplary computing systems may be used to implement embodiments of the systems and methods disclosed herein. The computing systems may include one or more processors and memory. The memory may include a computer-readable storage medium. Common forms of computer-readable storage media include, for example, a floppy disk, a flexible disk, a hard disk, magnetic tape, any other magnetic medium, a CD-ROM disk, digital video disc (DVD), various forms of volatile memory, non-volatile memory that can be electrically erased and rewritten. Examples of such non-volatile memory include NAND flash and NOR flash and any other optical medium. The memory can also comprise various other memory technologies as they become available in the future. Main memory stores, in part, instructions and data for execution by a processor to cause the computing system to control the operation of the various elements in the systems described herein to provide the functionality of certain embodiments. Main memory may include a number of memories including a main random access memory (RAM) for storage of instructions and data during program execution and a read only memory (ROM) in which fixed instructions are stored. Main memory may store executable code when in operation. The system further may include a mass storage device, portable storage medium drive(s), output devices, user input devices, a graphics display, and peripheral devices. The components may be connected via a single bus. Alternatively, the components may be connected via multiple buses. The components may be connected through one or more data transport means. Processor unit and main memory may be connected via a local microprocessor bus, and the mass storage device, peripheral device(s), portable storage device, and display system may be connected via one or more input/output (I/O) buses. Mass storage device, which may be implemented with a magnetic disk drive or an optical disk drive, may be a non-volatile storage device for storing data and instructions for use by the processor unit. Mass storage device may store the system software for implementing various embodiments of the disclosed systems and methods for purposes of loading that software into the main memory. Portable storage devices may operate in conjunction with a portable non-volatile storage medium, such as a floppy disk, compact disk or Digital video disc, to input and output data and code to and from the computing system. The system software for implementing various embodiments of the systems and methods disclosed herein may be stored on such a portable medium and input to the computing system via the portable storage device. Input devices may provide a portion of a user interface. Input devices may include an alpha-numeric keypad, such as a keyboard, for inputting alpha-numeric and other information, or a pointing device, such as a mouse, a trackball, stylus, or cursor direction keys. In general, the term input device is intended to include all possible types of devices and ways to input information into the computing system. Additionally, the system may include output devices. Suitable output devices include speakers, printers, network interfaces, and monitors. Display system may include a liquid crystal display (LCD) or other suitable display device. Display system may receive textual and graphical information, and processes the information for output to the display device. In general, use of the term output device is intended to include all possible types of devices and ways to output information from the computing system to the user or to another machine or computing system. Peripherals may include any type of computer support device to add additional functionality to the computing system. Peripheral device(s) may include a modem or a router or other type of component to provide an interface to a communication network. The communication network may comprise many interconnected computing systems and communication links. The communication links may be wireline links, optical links, wireless links, or any other mechanisms for communication of information. The components contained in the computing system may be those typically found in computing systems that may be suitable for use with embodiments of the systems and methods disclosed herein and are intended to represent a broad category of such computing components that are well known in the art. Thus, the computing system may be a personal computer, hand held computing device, tablets, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, and other suitable operating systems. Due to the ever changing nature of computers and networks, the description of the computing system is intended only as a specific example for purposes of describing embodiments. Many other configurations of the computing system are possible having more or less components.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An information delivery system for a cup, the system comprising:
   one or more machine readable indicia printed or otherwise coupled to an outer surface of the cup;
   a rotating top label covering at least a portion of the outer surface of the cup; and
   a transparent window within a portion of the rotating top label, the transparent window allowing at least one of the machine readable indicia to be visible through the transparent window, wherein the machine readable indicia is configured to cause an electronic device to execute a function when the machine readable indicia is scanned by the electronic device, the function being display of a website on the electronic device.

2. The system of claim 1, wherein at least one of the indicia is a bar code.

3. The system of claim 1, wherein at least one of the indicia is a quick response code.

4. The system of claim 1, wherein the function is the display of a scannable coupon on the electronic device.

5. The system of claim 1, wherein the function is downloading of an application onto the electronic device.

6. The system of claim 1, wherein the function is automatic registration in a contest.

7. The system of claim 1, wherein the function is a launching of an interactive game on the electronic device.

8. The system of claim 2, wherein the bar code is configured to cause an electronic device to execute a function when the bar code is photographed by the electronic device.

9. The system of claim 3, wherein the quick response code is configured to cause an electronic device to execute a function when the quick response code is photographed by the electronic device.

10. The system of claim 1, wherein the function is the display of product information.

11. The system of claim 10, wherein the product information includes promotional information about a related product.

12. The system of claim 10, wherein the product information includes a recipe for a product having the machine readable indicia scanned by the electronic device.

13. A method for delivering information associated with a cup, the method comprising:
    printing or otherwise coupling at least one machine readable indicia to an outer surface of the cup;
    covering at least a portion of the outer surface of the cup with a rotating top label; and
    placing a transparent window within a portion of the rotating top label, the transparent window allowing at least one of the machine readable indicia to be visible through the transparent window, wherein the machine readable indicia is configured to cause an electronic device to execute a function when the machine readable indicia is scanned by the electronic device, the function being display of a website on the electronic device.

14. The method of claim 13, wherein at least one of the indicia is a bar code.

15. The method of claim 13, wherein at least one of the indicia is a quick response code.

16. The method of claim 13, wherein the function is the display of a scannable coupon on the electronic device.

17. The method of claim 13, wherein the function is downloading of an application onto the electronic device.

18. The method of claim 13, wherein the function is automatic registration in a contest.

19. The method of claim 13, wherein the function is a launching of an interactive game on the electronic device.

20. The method of claim 14, wherein the bar code is configured to cause an electronic device to execute a function when the bar code is photographed by the electronic device.

21. The method of claim 15 wherein the quick response code is configured to cause an electronic device to execute a function when the quick response code is photographed by the electronic device.

22. The method of claim 13, wherein the function is the display of product information.

23. The method of claim 22, wherein the product information includes promotional information about a related product.

24. The method of claim 22, wherein the product information includes a recipe for a product having the machine readable indicia scanned by the electronic device.

25. An information delivery system for a cup, the system comprising:
    one or more machine readable indicia printed or otherwise coupled to an outer surface of the cup;
    at least one text panel printed or otherwise coupled to the outer surface of the cup;
    a rotating label covering at least a portion of the outer surface of the cup; and
    a transparent window within a portion of the rotating label, the transparent window allowing at least one of the machine readable indicia and the text panel to be visible through the transparent window.

26. The system of claim 25, wherein at least one of the indicia and the text panel is imprinted on the outer surface of the cup.

27. The system of claim 25, wherein at least one of the indicia and the text panel is embossed on the outer surface of the cup.

28. The system of claim 25, wherein at least one of the indicia and the text panel is molded on the outer surface of the cup.

29. The system of claim 25, wherein at least one of the indicia is a bar code.

30. The system of claim 25, wherein at least one of the indicia is a quick response code.

31. The system of claim 25, wherein the machine readable indicia is configured to cause an electronic device to execute a function when the machine readable indicia is scanned by the electronic device.

* * * * *